United States Patent
Anderson et al.

(10) Patent No.: US 10,558,776 B2
(45) Date of Patent: Feb. 11, 2020

(54) TRIGGER-ACTION-CIRCUITS: LEVERAGING GENERATIVE DESIGN TO ENABLE NOVICES TO DESIGN AND BUILD CIRCUITRY

(71) Applicant: Autodesk, Inc., San Rafael, CA (US)

(72) Inventors: Fraser Anderson, Newmarket (CA); Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 16/155,116

(22) Filed: Oct. 9, 2018

(65) Prior Publication Data

US 2019/0108294 A1    Apr. 11, 2019

Related U.S. Application Data

(60) Provisional application No. 62/569,840, filed on Oct. 9, 2017.

(51) Int. Cl.
*G06F 17/50* (2006.01)

(52) U.S. Cl.
CPC ........ *G06F 17/505* (2013.01); *G06F 17/5054* (2013.01); *G06F 17/5072* (2013.01); *G06F 17/5077* (2013.01); *G06F 17/5081* (2013.01)

(58) Field of Classification Search
CPC . G06F 17/505; G06F 17/5054; G06F 17/5072
USPC ....................................................... 716/106
See application file for complete search history.

(56) References Cited

U.S. PATENT DOCUMENTS

| | | | | |
|---|---|---|---|---|
| 8,782,577 B2* | 7/2014 | Fischer | ............... | G06F 17/5068 716/100 |
| 2012/0023471 A1* | 1/2012 | Fischer | ............... | G06F 17/5068 716/115 |
| 2016/0171136 A1* | 6/2016 | Iskander | ............. | G06F 17/5063 716/106 |
| 2018/0101634 A1* | 4/2018 | Hashimoto | ........... | G06F 17/505 |

OTHER PUBLICATIONS

Booth, T., et al., "Crossed Wires: Investigating the Problems of End-User Developers in a Physical Computing Task", Proceedings of the 2016 CHI Conference on Human Factors in Computing Systems (CHI '16), ACM, pp. 3485-3497.

(Continued)

*Primary Examiner* — Suchin Parihar
(74) *Attorney, Agent, or Firm* — Gates & Cooper LLP

(57) ABSTRACT

A method, system, and apparatus provide the ability to design a circuit. A behavior of the circuit is authored by dragging nodes from side panels and connecting them in an authoring canvas. Multiple circuit designs that satisfy the behavior are generated. A data grid table is generated and displays the circuit designs with each row representing a design, and the table is sortable based on columns that represent computed metrics. Upon selection of a design in the table, a computer generated circuit diagram is rendered. Interactive assembly instructions are generated and displayed. The interactive assembly instructions provide a text-based step-by-step guide to wire the circuit. Further, upon selection of an assembly instruction step, a corresponding element in the computer generated circuit diagram is highlighted.

22 Claims, 13 Drawing Sheets

(56) References Cited

OTHER PUBLICATIONS

Chakrabarti, A., et al., "Computer-Based Design Synthesis Research: An Overview", Journal of Computing and Information Science in Engineering, Jun. 2011, pp. 021003-1-021003-10, vol. 11.

Dey, A.K., et al., "A Conceptual Framework and a Toolkit for Supporting the Rapid Prototyping of Context-Aware Applications", Hum.-Comput. Interact., 2001, pp. 97-166, vol. 16, No. 2.

Dey, A.K., et al., "a CAPpella: Programming by Demonstration of Context-Aware Applications", Letters Chi, Apr. 2004, pp. 33-40, vol. 6, No. 1.

Dey A.K., et al. "iCAP: Interactive Prototyping of Context-Aware Applications", Pervasive Computing, Kenneth P. Fishkin, Bernt Schiele, Paddy Nixon and Aaron Quigley (eds.). Springer Berlin Heidelberg, 2006, pp. 254-271.

Drew, D., et al., "The Toastboard: Ubiquitous Instrumentation and Automated Checking of Breadboarded Circuits", Proceedings of the 29th Annual Symposium on User Interface Software and Technology (UIST '16), ACM, 2016, pp. 377-686.

Ferreira, B., et al., "Generative Design for Building Information Modeling", Real Time-Proceedings of the 33rd eCAADe Conference, 2015, pp. 635-644.

Greenberg, S., et al. "Phidgets: Easy Development of Physical Interfaces through Physical Widgets", Proceedings of the ACM UIST 2001 Symposium on User Interface Software and Technology, Nov. 11-14, Orlando, Florida. ACM Press, pp. 1-10.

Hartmann, B., et al., "Authoring Sensor-based Interactions by Demonstration with Direct Manipulation and Pattern Recognition", Proceedings of the SIGCHI Conference on Human Factors in Computing Systems (CHI '07), ACM, 2007, pp. 145-154.

Hartmann, B., et al., "Reflective Physical Prototyping through Integrated Design, Test, and Analysis", Proceedings of the 19th Annual ACM Symposium on User Interface Software and 20 Technology (UIST '06), ACM, 2006, pp. 299-308.

Hodges, S., et al., "Circuit Stickers: Peel-and-Stick Construction of Interactive Electronic Prototypes", Proceedings of the 32nd Annual ACM Conference on Human Factors in Computing Systems (CHI '14), ACM, 2014, pp. 1743-1746.

Houben, S., et al., "Physikit: Data Engagement Through Physical Ambient Visualizations in the Home", Proceedings of the 2016 CHI Conference on Human Factors in Computing Systems (CHI '16), ACM, 2016, pp. 1608-1619.

Humble, J., et al., ""Playing with the Bits" User-configuration of Ubiquitous Domestic Environments", UbiComp 2003: Ubiquitous Computing, Anind K. Dey, Albrecht Schmidt and Joseph F. McCarthy (eds.). Springer Berlin Heidelberg, pp. 256-263.

Kawahara, Y., et al., "Instant Inkjet Circuits: Lab-based Inkjet Printing to Support Rapid Prototyping of UbiComp Devices", Proceedings of the 2013 ACM International Joint Conference on Pervasive and Ubiquitous Computing (UbiComp '13), ACM, 2013, pp. 363-372.

Kazemitabaar, M., et al., "MakerWear: A Tangible Approach to Interactive Wearable Creation for Children", Proceedings of the 2017 CHI Conference on Human Factors in Computing Systems (CHI '17), ACM, 2017, pp. 133-145.

Ledo, D., et al., "Pineal: Bringing Passive Objects to Life with Embedded Mobile Devices", Proceedings of the 2017 CHI Conference on Human Factors in Computing Systems (CHI '17), ACM, 2017, pp. 2583-2593.

Lo, J., et al., "Aesthetic Electronics: Designing, Sketching, and Fabricating Circuits through Digital Exploration", Proceedings of the 29th Annual Symposium on User Interface Software and Technology (UIST '16), ACM, 2016, pp. 365-676.

MacMillen, D., et al., "An Industrial View of Electronic Design Automation", IEEE Transactions on Computer Aided Design of Integrated Circuits and Systems, Dec. 2000, pp. 1428,1448, vol. 19, No. 12.

McGrath, W., et al., "Bifröst: Visualizing and Checking Behavior of Embedded Systems across Hardware and Software", Proceedings of ACM User Interface and Software Technology, ACM, Oct. 2017, pp. 299-310.

Mellis, D.A., et al., "Engaging Amateurs in the Design, Fabrication, and Assembly of Electronic Devices", Proceedings of the 2016 ACM Conference on Designing Interactive Systems (DIS '16), ACM, pp. 1270-1281.

Ramakers, R., et al., "RetroFab: A Design Tool for Retrofitting Physical Interfaces using Actuators, Sensors and 3D Printing", Proceedings of the 2016 CHI Conference on Human Factors in Computing Systems (CHI '16), ACM, pp. 109-419.

Ramakers, R., et al., "PaperPulse: An Integrated Approach for Embedding Electronics in Paper Designs", ACM SIGGRAPH, 2015 Posters (SIGGRAPH '15), ACM, pp. 9:1-9:1.

Ramesh, R., et al., "Turning Coders into Makers: The Promise of Embedded Design Generation", Proceedings of the 1st Annual ACM Symposium on Computational Fabrication (SCF '17), ACM, 2017, pp. 4:1-4:10.

Resnick, M., et al., "Design Principles for Tools to Support Creative Thinking", Report of Workshop on Creativity Support Tools, 2005, pp. 1-16.

Salber, A., et al., "The Context Toolkit: Aiding the Development of Context-Enabled Applications", In Proceedings of CHI'99, Pittsburgh, PA, May 15-20, pp. 434-441, 1999, ACM Press.

Thompson, A., et al., "Explorations in Design Space: Unconventional electronics design through artificial evolution", IEEE Transactions on Evolutionary Computation, 1999, pp. 167-196, vol. 3, No. 3.

Vassilev, V.K., et al. "Towards the Automatic Design of More Efficient Digital Circuits", Evolvable Hardware, 2000. Proceedings. The Second NASA/DoD Workshop on, IEEE, pp. 151-160.

Zaman, L., et al., GEM-NI: A System For Creating and Managing Alternatives In Generative Design, Proceedings of the 33rd Annual ACM Conference on Human Factors in Computing Systems, ACM, 2015, pp. 1201-1210.

Chase, S.C., "Generative design tools for novice designers: Issues for selection", Automation in Construction, 2005, pp_ 689-698, vol. 14, No_ 6_.

* cited by examiner

CIRCUITS (6)

| Microcontroller | Components Ava | Cost | Difficulty | Popularity | Assembly Tim | Power Consumpt | Connection Met | Volume |
|---|---|---|---|---|---|---|---|---|
| Arduino UNO | 6/6 ($0.00) to c | $18.00 | 10.00 | 2.00 | 53 m | 4.1 W | Through-hole | 6 cm3 |
| Arduino UNO | 5/6 ($16.80) to | $20.30 | 9.50 | 1.70 | 50 m | 4.1 W | Through-hole | 6 cm3 |
| Arduino UNO | 5/6 ($16.80) to | $24.40 | 7.50 | 1.00 | 41 m | 4.1 W | Through-hole | 7 cm3 |
| Arduino Micro | 5/6 ($16.80) to | $27.00 | 9.10 | 1.10 | 49 m | 4.6 W | Through-hole | 6 cm3 |
| Arduino Micro | 5/6 ($35.84) to | $29.30 | 8.90 | 2.50 | 48 m | 4.3 W | Through-hole | 6 cm3 |
| Arduino Micro | 4/6 ($24.64) to | $33.40 | 9.50 | 4.30 | 50 m | 4.1 W | Through-hole | 6 cm3 |
| Arduino UNO | 6/6 ($0.00) to c | $18.00 | 9.20 | 3.70 | 48 m | 4.3 W | Through-hole | 6 cm3 |
| Arduino UNO | 5/6 ($20.16) to | $20.30 | 8.20 | 2.60 | 43 m | 4.1 W | Through-hole | 6 cm3 |
| Arduino UNO | 5/6 ($19.04) to | $24.40 | 8.50 | 0.50 | 46 m | 4.3 W | Through-hole | 6 cm3 |
| Arduino Micro | 5/6 ($19.04) to | $27.00 | 9.20 | 4.30 | 50 m | 4.1 W | Through-hole | 6 cm3 |
| Arduino Micro | 4/6 ($40.32) to | $29.30 | 7.90 | 0.10 | 43 m | 4.6 W | Through-hole | 7 cm3 |
| Arduino Micro | 4/6 ($26.88) to | $33.40 | 8.40 | 0.20 | 44 m | 4.6 W | Through-hole | 6 cm3 |
| Arduino UNO | 6/6 ($0.00) to c | $18.00 | 9.20 | 3.60 | 49 m | 4.1 W | Through-hole | 7 cm3 |
| Arduino UNO | 5/6 ($16.80) to | $20.30 | 9.30 | 1.00 | 50 m | 4.3 W | Through-hole | 6 cm3 |
| Arduino UNO | 5/6 ($20.16) to | $24.40 | 9.40 | 2.80 | 51 m | 4.1 W | Through-hole | 7 cm3 |
| Arduino Micro | 5/6 ($17.92) to | $27.00 | 9.20 | 4.40 | 48 m | 4.1 W | Through-hole | 6 cm3 |
| Arduino Micro | 4/6 ($29.12) to | $29.30 | 8.00 | 2.50 | 43 m | 4.6 W | Through-hole | 6 cm3 |
| Arduino Micro | 4/6 ($40.32) to | $33.40 | 8.00 | 4.40 | 43 m | 4.1 W | Through-hole | 7 cm3 |
| Arduino UNO | 5/6 ($11.20) to | $18.00 | 8.90 | 2.80 | 48 m | 4.3 W | Through-hole | 6 cm3 |
| Arduino UNO | 4/6 ($33.60) to | $20.30 | 7.80 | 1.30 | 41 m | 4.1 W | Through-hole | 6 cm3 |
| Arduino UNO | 4/6 ($26.88) to | $24.40 | 10.10 | 4.90 | 53 m | 4.3 W | Through-hole | 6 cm3 |
| Arduino Micro | 4/6 ($42.56) to | $27.00 | 8.20 | 2.20 | 43 m | 4.1 W | Through-hole | 6 cm3 |

TRIGGER-ACTION-CIRCUITS: LEVERAGING GENERATIVE DESIGN TO ENABLE NOVICES TO DESIGN AND BUILD CIRCUITRY

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/569,840, filed on Oct. 9, 2017, with inventor(s) Fraser Anderson, Tovi Grossman, and George Fitzmaurice, entitled "SYSTEM FOR COMPUTING AND EXPLORING GENERATIVELY DESIGNED CIRCUITS,".

This application is related to the following co-pending and commonly-assigned patent application, which application is incorporated by reference herein: U.S. patent application Ser. No. 15/291,032, entitled "AUTOMATED TECHNIQUES FOR DESIGNING PROGRAMMED ELECTRONIC DEVICES", with inventor(s) Tovi GROSSMAN, George FITZMAURICE, and Fraser ANDERSON, filed on Oct. 11, 2016, which application claims the benefit of U.S. Provisional Application 62/258,391 filed on Nov. 20, 2015.

BACKGROUND OF THE INVENTION

1. Field of the Invention

The present invention relates generally to circuit design, and in particular, to a method, apparatus, system and article of manufacture for designing circuits based on high-level behavioral descriptions.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Overview of Related Art

The ability to rapidly evaluate designs via prototyping is a powerful and widely used approach amongst designers, makers and researchers in many fields. In recent years, several techniques and products have been developed to allow novices to prototype circuitry and electronic devices without extensive technical knowledge. Hardware platforms such as ARDUINO or PHIDGETS allow users with minimal electronics knowledge to construct functioning circuits, and visual programming languages such as WYLIODRIN enable the authoring of higher-level software that interfaces with such hardware. While these tools have reduced the barrier to entry, they still require some technical background.

Despite advances in hardware development platforms, novices are still intimidated by circuitry. The development of circuits still requires extensive knowledge of electrical theory as well as knowledge of, and about, a large library of components. While more approachable hardware platforms such as LITTLEBITS and PHIDGETS [11] have been developed, such platforms are constrained to the use of proprietary components and subsequently, the functionality that is supported by the manufacturer.

Similarly, while specialized programming languages can simplify programming activities and make them more approachable, they still require a base level of programming knowledge (e.g., control flow, Boolean logic, memory, etc.), which many designers and makers do not have. For example, a recent study by Booth et al. showed that only six out of twenty participants (some of which had programming backgrounds), could successfully complete a simple physical computing task [2].

Detailed Description of Related Art

Recent developments in the rapid prototyping of electronics have enabled users to quickly implement, assemble, and evaluate their ideas with greater ease and fidelity. Further, the field of generative design leverages computation to automatically synthesize design variants.

Assembling Circuits

Novices can have substantial difficulty working with and assembling electronics. Booth et al. [2] conducted a study in which novices were asked to construct a simple circuit with an ARDUINO (an open source electronic prototyping platform for users to create interactive electronic objects), given only a high-level description of the circuit's behavior. Participants encountered a number of challenges along the way, including choosing the wrong components, using the wrong logic and variables, and wiring components incorrectly. Only 6 of the 20 participants successfully completed the task, highlighting the need for approaches and tools to simplify this process. Mellis et al. [24] conducted a series of workshops probing a similar problem—how novices would construct electronics using circuit boards. These workshops were much more in-depth, but revealed some similar findings, such as erroneous component selection and debugging, but also called for new tools to provide "better abstractions in circuit design software".

Recently, Drew et al. developed the TOASTBOARD, an intelligent breadboard that can assist novices during circuit debugging [9]. This device provides LED indicators on the breadboard itself, along with a software interface that gives more detailed information to the user, including potential troubleshooting tips. Similarly, Bifrost [23] instruments both hardware and software to allow the user to trace the state of their program and compare expected to actual values. In contrast to these hardware solutions, which aids in circuit debugging, embodiments of the invention utilize a software solution to aid in circuit design and assembly.

Rapid Prototyping of Electronic Devices

Several systems have developed solutions that enable users to integrate custom circuitry into their projects. Some of these approaches, such as Inkjet Circuits [17] and Circuit Stickers [14] have enabled users to design and fabricate circuits using readily-available hardware such as inkjet printers. Custom hardware platforms, such as PHIDGETS, PAPERPULSE [26], RETROFAB [25], MAKERWEAR [18], PHYSIKIT [15] and work by Hartmann et al. [12, 13], provide hardware solutions for users to develop systems that make use of specific electronics with little effort. However, these systems are limited to supporting the proprietary hardware modules developed specifically for the respective systems. In contrast, embodiments of the invention makes use of commercial, off-the-shelf components and supports a wide array of Arduino-compatible microcontrollers and standard components.

ELLUSTRATE [21] enables novice users to sketch out circuits on a tablet, and guides them during the design and fabrication processes. However, this approach is limited to simpler electronic designs with no high-level behavior design.

There are also number of software-centric approaches that aim to simplify the programming of circuits and electronic devices. ACAPPELLA [7] and ICAP [8] allow for programming by demonstration of context-aware applications, letting the user demonstrate the trigger they wish to recognize directly, with no programming involved. However, their approach is limited to specialized hardware and a narrow set of recognizable triggers. In a similar fashion, the context toolkit [6, 29] allows for simple composition of recognizable contexts, but still requires knowledge of programming. In contrast, embodiments of the invention present users with a high-level visual programming language, lowering the threshold for use and simplifying the specification of the desired behavior. Additionally, embodiments of the invention uses off-the-shelf, commercially available hardware. Both the supported behaviors as well as the components are modifiable by end users, enabling users with technical knowledge to increase the capabilities of the system.

A number of visual programming languages have been developed to ease hardware programming and data flow management, such as JIGSAW [16], NODERED (available via nodered.org), and LABVIEW (ni.com/labview). Similarly, PINEAL [20] leverages a visual programming language to enable users to prototype interactive objects using a smart phone. Unfortunately, these languages are simple visual representations of complex programming concepts (e.g., flow control, variables), or have limited hardware support. In contrast, IFTTT (ifttt.com) allows for the high-level specification of behaviors through trigger-action programming, but is limited to select commercial products (e.g., PHILLIPS HUE, TWITTER) and may require significant technical knowledge to support custom hardware devices.

Generative Design

Generative design has emerged as a means to enable designers, engineers and artists to specify high level rules, goals, constraints, or problems and have the computer produce and present potential solutions [10]. In contrast to traditional design approaches where users select, modify, and create all elements of design, a generative design approach "provides tools to vary designs beyond direct manipulation of specific design elements" [32]. Enabling the designer to operate at a high-level and leveraging computational power to explore alternatives allows for a greater number of designs to be evaluated, and can enable the creation of designs that would not have been possible by humans alone [4]. This approach could also be used as a pedagogical tool for novice designers [15], providing a platform for introducing key concepts of the target domain.

These prior systems that leverage generative design typically allow users to specify geometry, forces, or other physical constraints [19] and then the system presents a set of 3D objects that meet these requirements using approaches such as topology optimization [1] or genetic algorithms [3]. In contrast, embodiments of the invention enable designers to specify the desired behavioral requirements of an electronic device, with the system generating the required circuitry. While the objective is similar to traditional geometry-based generative design, (i.e., the high-level specification of design goals), the domain, implementation, and use case are different and pose unique challenges.

There is existing work within the field of electronic design automation (EDA) to leverage computation to optimize the design of circuitry [22]. Such approaches focus on the low-level design and optimization of circuitry [30, 31], enabling circuits that are more robust or efficient than what could be designed by hand. These existing works support highly-technical engineers in refining and creating complex circuitry, whereas the embodiments of the invention focus on enabling novices to author and prototype electronic devices. Recent work by Ramesh et al. [27] explores the promise of generative design for circuits using a constraint solver, but little attention is paid to how users would author the behaviors, explore alternatives, or assemble the device.

SUMMARY OF THE INVENTION

Embodiments of the invention provide TAC (Trigger-Action-Circuits), a system supporting novice users in the design and assembly of functional electronic devices. The system uses a generative design approach, allowing users to specify desired functionality at an abstract behavioral level using triggers (i.e., inputs) and actions (i.e., outputs), as well as continuous 'to-from' mappings. From this specification, TAC generates a variety of candidate circuits using its database of components, and presents the alternatives to the user so that they can choose the most appropriate circuit for their task. TAC is able to generate and upload the associated firmware to a microcontroller, and creates the corresponding diagram and assembly instructions to guide the user through the construction process.

One exemplary implementation of TAC is with ARDUINO-compatible microcontrollers that can support numerous input and output components. While such an exemplary implementation is sufficient to support a wide range of circuits and behaviors, the concepts presented herein may be used on/with other hardware platforms and component libraries. Embodiments of the invention demonstrate the use of TAC for the design and assembly of a variety of circuits (e.g., including those from the ARDUINO Starter Kit). A study shows that TAC helps users avoid problems encountered during circuit design and assembly, with users of the system able to complete the "Love-o-Meter" circuit in an average of 36 minutes, while all participants in the baseline condition unable to finish within the 45 minute time frame.

BRIEF DESCRIPTION OF THE DRAWINGS

Referring now to the drawings in which like reference numbers represent corresponding parts throughout:

FIG. 3 illustrates a generated circuit explorer that allows users to explore possible circuits synthesized in accordance with one or more embodiments of the invention;

FIG. 7 illustrates an exemplary XML file in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Trigger-Action Circuits (TAC)

Figure 1:
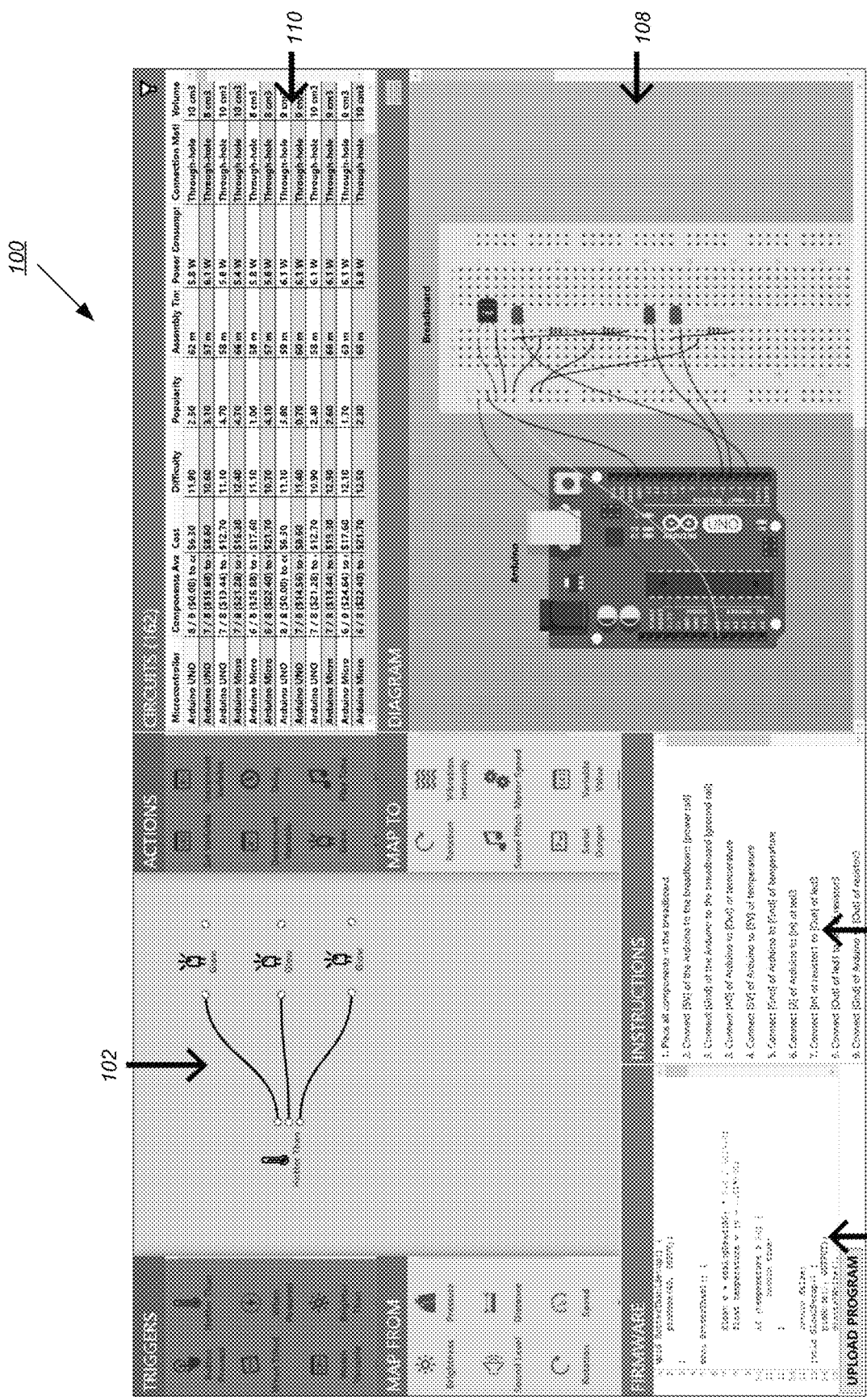
FIG. 1 illustrates an overview of a TAC interface used in accordance with one or more embodiments of the invention.

Embodiments of the invention provide for trigger-action circuits (TAC). TAC is a system that generates circuitry, firmware, and assembly instructions from a user's high-level behavioral description of the desired functionality. FIG. 1 illustrates an overview of a TAC interface used in accordance with one or more embodiments of the invention. The system utilizes a generative design approach to enable novices to construction functional electronic circuits.

As illustrated, the system 100 includes an authoring canvas 102, firmware 104, assembly instructions 106, an interactive diagram 108, and a generated circuit explorer 110. Each of these areas 102-110 of the system 100 are described in further detail below.

User Walkthrough

To illustrate a typical use case of TAC, a scenario is described in which a designer would like to construct a device that monitors the temperature of a storage room. The device should display the current temperature on an LCD panel, turn on a warning light if the temperature exceeds 40° C., and sound an alarm if the temperature exceeds 80° C.

Authoring

Figure 2:
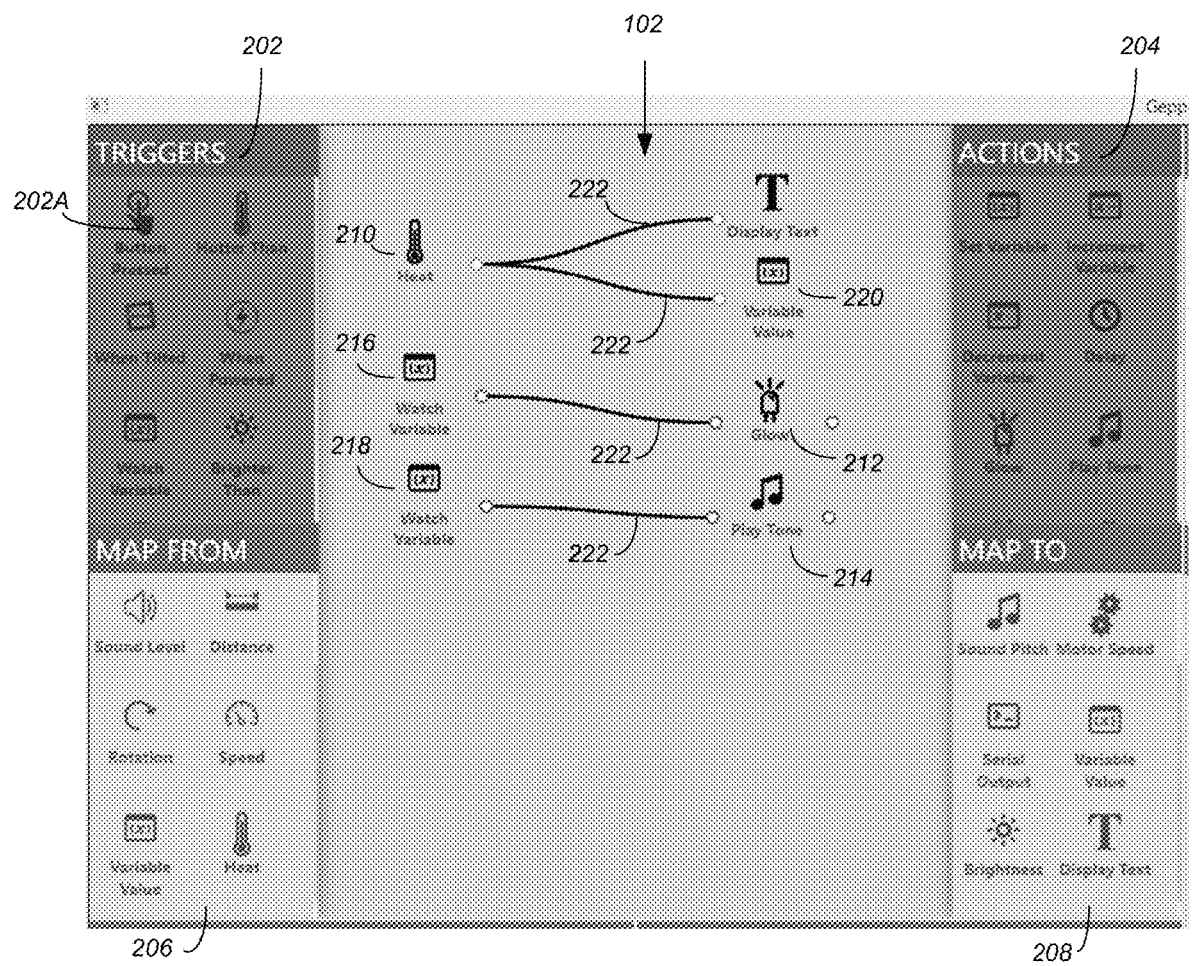
FIG. 2 illustrates the authored/authoring behavior of a circuit within an authoring canvas in accordance with one or more embodiments of the invention.

FIG. 2 illustrates the authored/authoring behavior of a circuit within an authoring canvas 102 in accordance with one or more embodiments of the invention. To begin authoring the behavior of the circuit, the user begins by dragging nodes from the side panels 202-208 onto the canvas 102. Using Heat 210, Glow 212, Play Tone 214 and variables 216-220 elements, the user configures their parameters and connects them with links 222. The resulting visual program contains a relatively small number of elements and requires minimal user interaction to define. The high-level naming and pictorial representation of the behaviors (as displayed in authoring canvas 102) allow the user to quickly see the intended function of the program.

Circuit Selection

FIG. 3 illustrates the generated circuit explorer 110 that allows users to explore possible circuits synthesized by the system. From this view, users can sort based on criteria, and select the row to populate the diagram, assembly instructions, and firmware. During the authoring process, the circuit explorer 110 provides a table of candidate circuits that is updated in real-time, allowing the user to see the effects of adding each behavior to the workspace (e.g., to authoring canvas 102). Each row in the table represents a single candidate circuit, with the values in that circuit representing summary values for the entire circuit. Given that there may be parameters the user is interested in that are not specified in the behavior (e.g., cost, size, power consumption), the system generates several variants using its database of known components. After completing the authoring, the user inspects the table of potential circuits that will be able to perform the specified behavior and begins to explore the circuits to determine the most suitable circuit.

As the user is interested in rapidly prototyping the circuit using components they have on-hand, the user may sort by 'Components available' 302. The user notices that some circuits use an Arduino Micro board microcontroller, which the user does not have on hand, so the user can filter those controllers out using the filtering tool (e.g., activated via icon 304) in the circuit diagram. After exploring a few circuits and visually comparing diagrams, the user may select one that has low difficulty and one for which the user has all the components for. The user may also inspect the lowest-cost circuit to get an understanding of the cost if the circuit in desired in larger quantities.

Assembly

Figure 4:
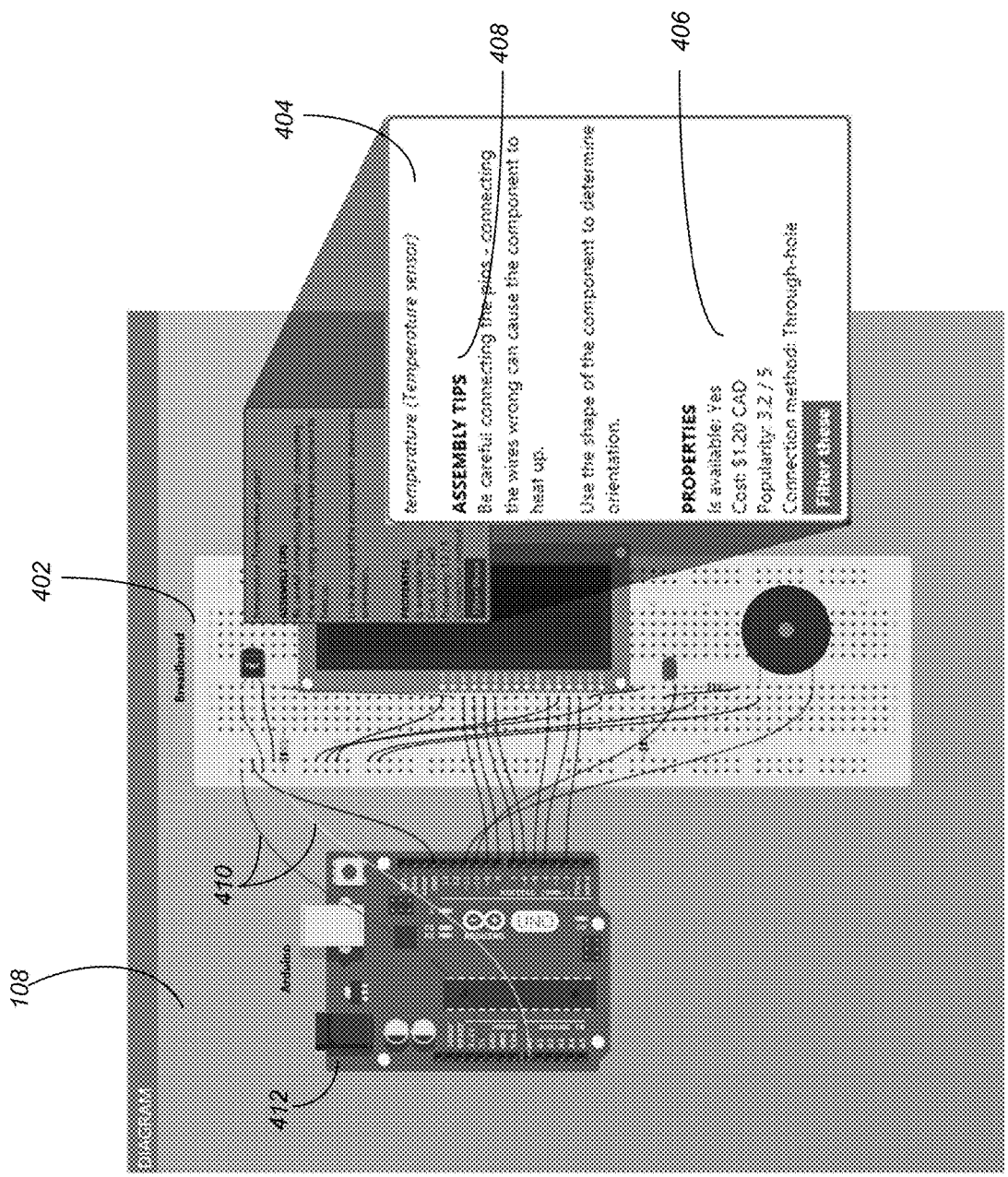
FIG. 4 illustrates a rendered circuit diagram with a tooltip for the temperature sensor shown in accordance with one or more embodiments of the invention.

FIG. 4 illustrates a rendered circuit diagram with a tooltip for the temperature sensor shown in accordance with one or more embodiments of the invention. As illustrated, the tooltip is enlarged for readability. The user begins assembly by inspecting the components in the diagram 108, and placing them in the breadboard 402. As the user place a component, the user hovers over each one in the diagram 108, revealing a tooltip 404 that may include various parameters and properties 406, as well as assembly tips 408 that will help the user avoid common pitfalls. These tooltips 404 can also provide contextual information, such as the name of the component or its typical function within common circuits.

Figure 5:
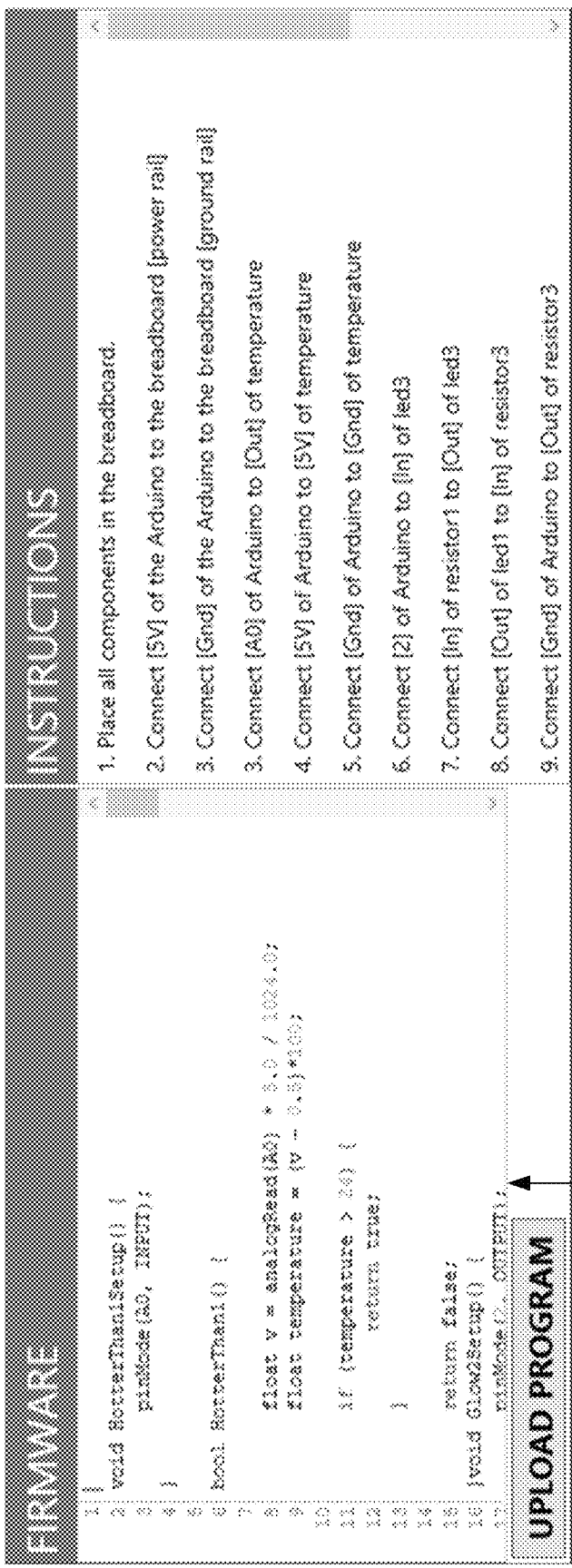
FIG. 5 illustrates an enlarged view of generated firmware and assembly instructions in accordance with one or more embodiments of the invention.

Once the components are placed (e.g., in breadboard 402), the user wires the circuit together, following the interactive instructions 106. FIG. 5 illustrates an enlarged view of the generated firmware 104 and assembly instructions 106 in accordance with one or more embodiments of the invention. By clicking on each instruction in area 106, the corresponding wires in the diagram 108 are highlighted, with the unrelated wires dimmed out. This allows the user to clearly see what connections are to be made.

Upload and Testing

Figure 6:
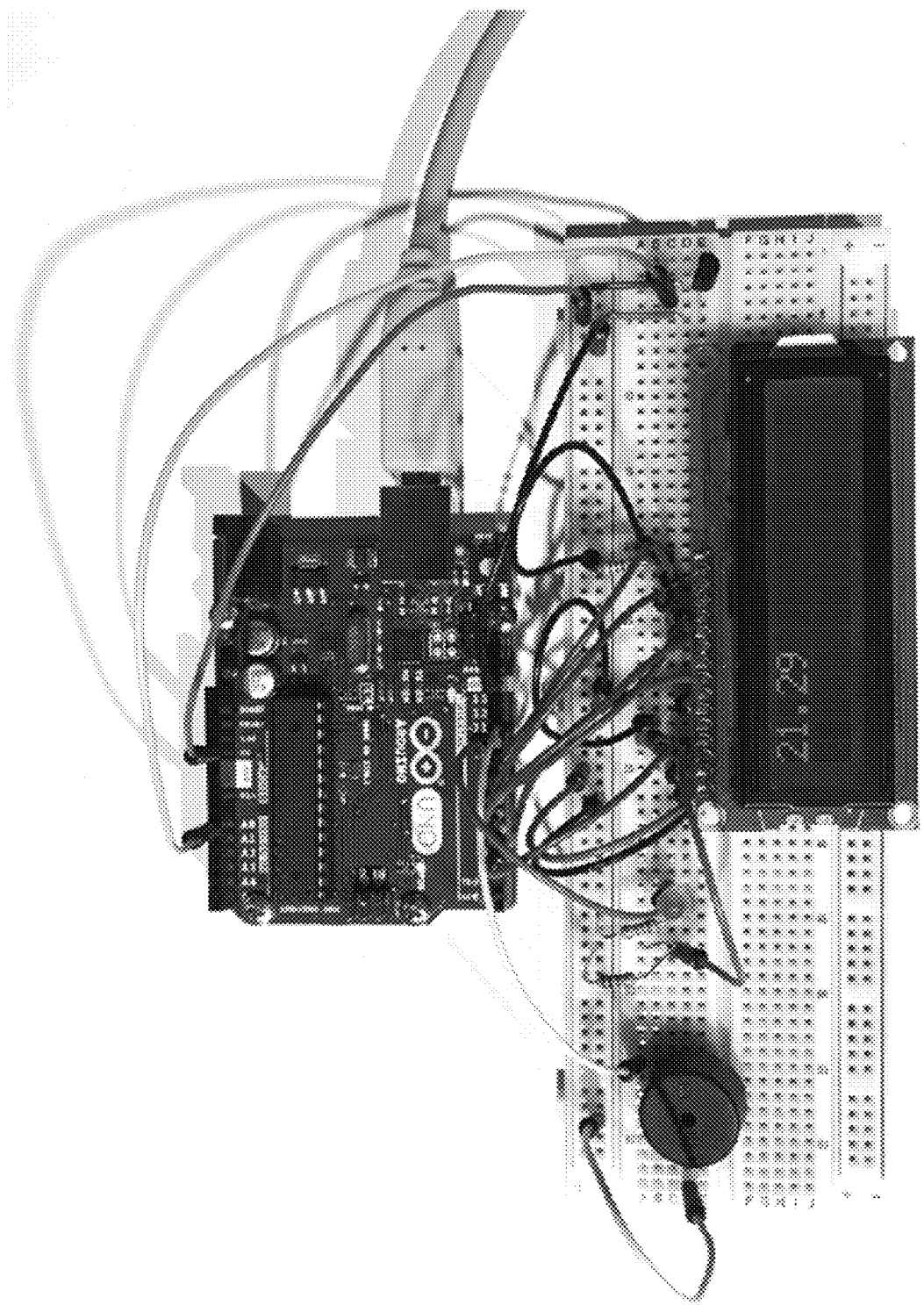
FIG. 6 illustrates an assembled, functioning circuit created in accordance with FIGS. 1-4 in accordance with or more embodiments of the invention.

Following assembly, the user may inspect the code (e.g., firmware 104) to gain an understanding of the underlying program. Once satisfied, they can upload the code directly to the Arduino (e.g., by selecting the "upload program" icon), with the interface providing feedback when the upload is complete. Once uploaded, the users can test and try out their design. For example, FIG. 6 illustrates an assembled, functioning circuit created in accordance with FIGS. 1-4 in accordance with or more embodiments of the invention.

Interface Elements

As illustrated in FIG. 1, the user interface is divided into five panels for each of the tasks the user must complete to construct their circuit.

Authoring Canvas 102

A behavior is specified through a visual programming language where users can specify two types of connections: Trigger-Action (TA) mappings (202-204), or From-To (FT) mappings (206-208). TA mappings 202-204 allow users to specify an action 204 to complete when a trigger 202 event occurs (e.g., when a button is pressed 202A, turn on a light). FT mappings 206-208 allow users to specify linear relationships between input parameters 206 and output parameters 208 (e.g., map the angle of a knob to the speed of a motor). These two concepts provide a simple way to address much of the functionality for many prototypes and proof-of-concept applications, and provide a low threshold [28] for novices to begin using the system to explore their designs. Triggers 202 can only be linked to Actions 204, and Map-From 206 can only be linked to Map-To 208 nodes. To support more complex behaviors with delays, for instance, Actions 204 can be chained together, allowing a single Trigger 202 to cause a sequence of Actions 204 to execute.

Within this framework, variables and logical operators such as 'AND' are supported as behaviors, which raises the ceiling of what users can do with the software. Variables are accessible through top-level behaviors in all TA 202-204 and FT 206-208 panels. Users can invoke actions 204 when variables take a given value, set variables when a particular event occurs, and variables can also have their value mapped to an input, or have their value used as input to a 'map from' 206 behavior. While the use of variables introduces some complexity for the user, it dramatically increases the available functionality of the system, and allows for much richer circuit design.

Behaviors can also define parameters that the user can specify. For instance, the temperature threshold that a 'Hotter Than' behavior triggers on is specified as a user-defined parameter. If users need to specify multiple parameters, they can clone the parameter set, which creates an additional set of parameters for that behavior that the user can specify through a dialog box accessible by double-clicking the behavior.

This is useful in instances where multiple triggers 202 are needed that stem from a single component, for instance, setting three separate temperature thresholds. Without this cloning functionality, users would have to create three separate 'Hotter Than' nodes, and the resulting circuits would use three separate temperature sensors.

Generated Circuit Explorer 110

To facilitate circuit selection, TAC provides users with a spreadsheet-like interface to inspect and explore generated circuits. Each potential solution to the desired behavior is presented as a row in the generated circuit explorer 110. Users can sort and navigate the columns to find their desired circuit.

To assist the user in selecting a circuit, TAC computes several metrics for each circuit. The table can be sorted by each of these metrics by clicking on the associated column header. Cost 306 is the sum of the cost of all components used in the circuit. Components available 302 is computed based in the local database of what components are on-hand—this is currently manually maintained but a future version could be automated and integrated with a component purchasing process. Difficulty 308 is computed as a function of the number of components and the encoded connection methods (e.g., surface mount components are weighted as being more difficult than through-hole components). Volume 310 and power consumption 312 are computed based on the component's defined parameters. Popularity 314 and assembly time 316 are using manually coded estimates for each component.

Circuit Diagram 108

Once a circuit is selected in the explorer 110, the corresponding diagram is created and displayed on the circuit diagram canvas 108. Users can zoom and pan the canvas 108 to inspect the circuit and terminal names. A button at the top of the diagram allows users to render the components on a breadboard 402 (default), or remove the breadboard 402 and show the components directly wired together. By clicking each wire 410, all other wires 410 become more transparent, allowing the selected wire 410 to be highlighted making its connections more apparent. Additionally, the instruction corresponding to that wire 410 becomes highlighted in the assembly instructions 106, giving the user additional context for the connection.

Users are able to filter circuits using the component diagram 108. By hovering over each component, users can view details about that component, and filter circuits containing that component. This functionality is useful for users who do not have specific components on hand, or who identify components as being too expensive or otherwise unsuitable for their application.

The automated layout of the circuit diagram on the breadboard 402 is optimized to reduce visual clutter, and enable users to easily trace wires 410. Placement of each component is determined by the following procedure:

First, the microcontroller 412 is placed in a fixed, central location of the canvas 108. Next, the breadboard 402 is placed to the right of it, with the rows of the breadboard running parallel to the rows of pins on the microcontroller 412. This alignment maximizes the amount of usable space on the breadboard 402 so that components and their wires 410 can be more spatially distributed.

Next, the individual electronic components are placed on the breadboard 402, with the electronic pins being aligned with the corresponding breadboard holes. The images of the components are all pre-aligned such that the pins naturally fall across multiple breadboard rows, ensuring that their electrical signals remain isolated. As each component is placed, the system maintains a database of the rows that each component uses, and prevents future components from being inserted into those rows unless they intend to be electrically connected. Once a component is placed, the next component will be placed further down on the breadboard 402, leaving one row between components to allow the user to clearly differentiate between the components.

Once all components are placed, the system draws Bezier curves between each pair of electrical terminals that need to be connected (e.g., between a breadboard 402 terminal and a terminal on the microcontroller 412). The curves are color coded to help the user differentiate what type of connection they are making (e.g., power, ground or signal). The use of curved lines rather than straight lines allows users to easily follow the connections as there is less overlap than if straight lines were used.

The order of the components is currently optimized such that the component placed first, is that corresponding to the lowest 'pin' number on the microcontroller 412. This heuristic results in substantially less overlapping wires than a naïve, random placement. An alternative to this approach is to vary the order of placement of components (either with a subset or using all possible permutations), and compute the number of wire crossings that result from that order, storing the configuration that has the minimum number of crossings.

This approach can generate the best diagram for users to follow as the wiring will be much more evident.

Assembly Instructions 106

TAC automatically generates instructions once a circuit is selected from the table 110. The assembly instructions 106 provide a step-by-step guide for the user to wire the resulting circuit together. Each step is described in text (e.g., 'Connect the ground of LED1 to GND of Arduino Uno'), which exposes users to some of the technical terms used in circuitry to help build electronics knowledge. In addition, as steps in the interface 106 are selected, the related connection highlights in the circuit diagram 108, giving the user a visual reference for the connection.

Instructions can be further augmented, if one of the components specifies assembly hints in its definition. For instance, the LEDs in the system specify 'Ensure the component is oriented the proper way—direction matters'. As connecting some components incorrectly can cause damage (e.g., capacitors, temperature sensors) or cause the system to function incorrectly, these tips are intended to help novices avoid problems with circuit assembly.

Firmware 104

Once generated, the firmware 104 can be inspected and directly edited by the user. This functionality may be useful to novices interested in learning more about electronics and programming, as it exposes them to the code that executes their behavior. Exposing the firmware may encourage tinkering, as users can modify and upload the program without fear of causing an irreversible error as the original program can be regenerated by the system. Currently, changes directly to the code do not impact the rest of the interface (e.g., updating the authoring canvas 102 or parameters).

Presenting the firmware allows users to create arbitrarily complex programs by exposing the full functionality of the microcontroller 412. More advanced users may find this feature useful as they can use the visual programming language to define the basic functionality and component interactions, use the circuit generation and filtering to select components and provide the wiring, then use the firmware editor to add more advanced or specific functionality not exposed through existing behaviors.

Once firmware has been selected and/or modified, clicking the upload button 502 will compile and upload the firmware to the microcontroller 412 that is attached to the USB port.

Implementation

One or more embodiments implement TAC as a desktop WPF (WINDOWS PRESENTATION FOUNDATION) application written in C#.

Components

Figure 7:
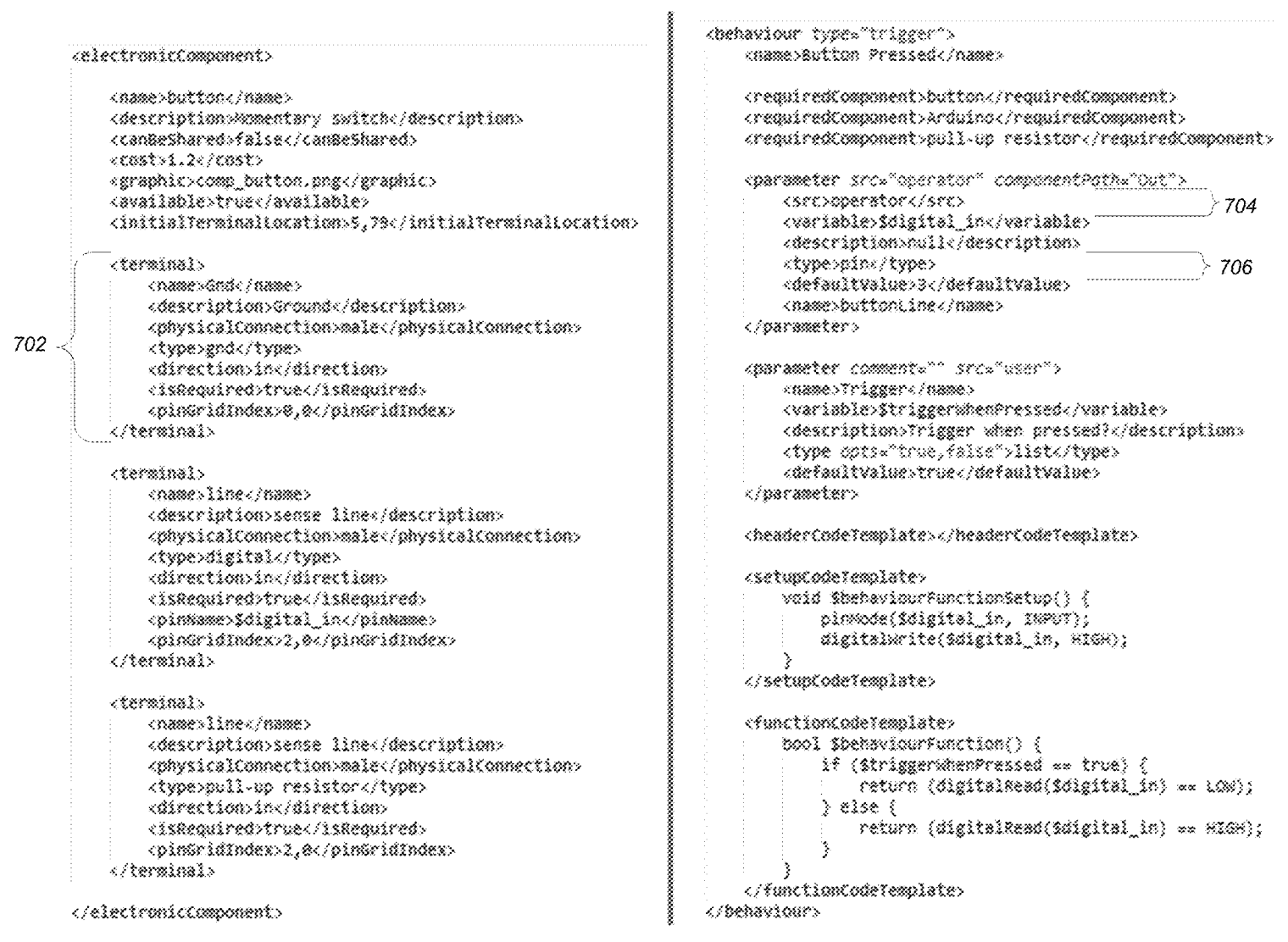

Each component that TAC supports is defined using a declarative specification within an XML (eXtensible Markup Language) file. FIG. 7 illustrates an exemplary XML file in accordance with one or more embodiments of the invention. This format allows for the addition or modification of components by third-party authors. Each component is defined by a number of top-level parameters as well as a list of terminals. The top-level parameters describe the type of component (i.e., which requirement it fulfils), as well as its name, description, cost, graphical image, and whether it's currently available to the user. An additional flag indicates if the component can be re-used or shared by other behaviors. Each of its terminals 702 (defined using the <terminal> tags) represents a (potential) electronic connection to another component in the circuit. Each terminal 702 is described by its name, type of connection, direction of connection, terminal location within the image, and whether the terminal can be shared. If specific terminals 702 are accessed by behaviors directly (e.g., reading temperature from an analog out terminal), that terminal 702 will be given a name to allow behaviors to reference it.

Embodiments of the invention may contain a variety of components to support a broad spectrum of behaviors. Several sensors and switches may be supported including a temperature sensor, light sensor, accelerometer, infrared distance sensor, momentary switch, and sound sensor. A number of actuator components may also be supported, including a number of LEDs, an audio buzzer, a DC motor, servo motor, and a vibrotactile motor. Further, a variety of microcontrollers may be fully supported such as the Arduino UNO and the Arduino Micro. The database may also contain a number of passive components, such as resistors and capacitors.

Behaviors

The supported high-level behaviors (i.e., Triggers, Actions, Mappings) within TAC may also be defined using an XML syntax (as illustrated in FIG. 7). As with components, such a definition and format allows end users with technical knowledge to define and share new behaviors. A behavior (or "behaviour") defines the components it depends on, the parameters it supports, as well as several code fragments defining the functionality. The required components list must match those 'types' defined in the component library. Each parameter defines a name, as well as a source and type. The parameter source 704 defines how the parameter will be defined (i.e., by the system, component, or by the user). The parameter type 706 defines what microcontroller resource will be used, if any (e.g., analog input, PWM output, etc.). A behavior also defines code fragments that will be placed into a larger template to assemble the complete functionality. Behaviors can provide code that is run during initialization (setup), each time the state is checked (function), as well as to the global area of the program to define global variables or include additional program directives (header).

Using this approach, both simple and more complex behaviors are possible. Examples of supported triggers are: when the temperature exceeds a threshold, when a device is tilted, or when a button is pressed. With the above in mind, FIG. 7 illustrates sample definitions for a 'button' component (left) and 'button pressed' trigger (right).

Circuit Generation

To generate the circuits, TAC uses a breadth-first, recursive, dependency resolution. As each trigger 202 and action 204 enumerates the class of components it needs (e.g., 'button'), and each component lists the components it requires (e.g., 'microcontroller', or 'resistor'), embodiments of the invention are able to explore all possible circuit solutions to the current mapping. As each component is added and each dependency is resolved, a list of consumed and available terminals is maintained. For example, no two components would be able to use the same 'A0' port on an ARDUINO, as it is not shareable; if a second component needing analog input were added to a circuit already using the 'A0' port, it would be assigned to 'A1'.

The circuit resolution halts when all dependencies have been met. As embodiments of the invention compile possible circuits, they maintain the state of each, compiling statistics such as the total cost, number of components, and total volume. More complex filter criteria may be useful to help pare down the increased number of possible circuits that are returned by the system.

Variable Types

TAC uses three variable types to enable the generation of circuits: user, component, and system.

User variables are parameters that require user input or configuration of a behavior. These parameters are presented with a plain-language description, and reasonable default values. Behaviors can leverage user-defined variables to provide inputs and parameters to their functionality. For example, the 'Hotter than' trigger provides a 'threshold' variable which the user specifies to define the target threshold for the trigger to execute. Similarly, the 'Display text' action leverages these parameters to allow the user to specify a string (or series of strings) as input, as well as a Boolean input value (presented as a checkbox) to specify if the strings should be displayed in order of input, or randomly.

Component variables are specified by the behavior, and defined by the component that satisfies that behavior. For instance, the 'Hotter than' behavior requires a sensor that is able to sense temperature based on an analog voltage reading. Each component that satisfies this behavior must specify the mapping between voltage and temperature (e.g., in Celsius). This mapping is defined through a component-provided variable which specifies the functional relationship between voltage and temperature.

System variables have their values specified by the system during the circuit-resolution process. These variables are used in both behaviors are components, and are used to specify pin mapping. With the 'Hotter than' example, the behavior specifies that it is expecting to read a voltage from $analog_pin which corresponds to the voltage provided to the temperature sensor. The component providing the analog value annotates which of its terminals provides the $analog_pin corresponding to the temperature. After mapping and circuit resolution, the system replaces the appropriate values with the mapped values to ensure that the behavior is reading the value from the appropriate pin (e.g., A0, A1, etc.).

Firmware Authoring

TAC generates ARDUINO compatible code in response to the behaviors created by the user. As parameterized code fragments are associated to each supported behavior, TAC can combine and compile each of the fragments into a single executable program using the following steps.

First, each of the parameters is replaced within the code fragment with its respective value (e.g., the user specified value, or the system determined value). The system also appends unique identifiers to function names and variables within a trigger or action, allowing for the many-to-many association. This replacement process operates across all defined triggers and actions. Once processed, the triggers and actions are compiled into a master template which assembles the header, setup, and function code for all defined behaviors into an ARDUINO-compatible format with setup( ) and loop( ) function declarations. Once complete, the assembled code is written to a file, then compiled and uploaded to the connected ARDUINO board.

Assembly Instruction Creation

Within TAC, instruction generation is a relatively straightforward process. As each terminal-to-terminal connection is retained during the circuit generation process, the system has a record of which component is connected to which pins. Using this knowledge, the system can generate the appropriate connection list using a lookup table. This approach is sufficient to enable users to understand which terminals should be connected, and supplements the diagram which the users can cross-reference.

Validation

To validate that the system could support the authoring of a wide range of circuitry, embodiments of the invention replicated the functionality of fourteen projects contained within a starter kit from ARDUINO. These projects span a wide range of functionality, from creating and sensing digital and analog signals, serial communication, monitoring and changing program state, and include a wide variety of electronic components. While the functionality of each project was replicated (in terms of inputs and outputs), the generated circuit and firmware were different between the provided solution and the one produced by TAC due to the methodical way in which TAC generates the solutions.

Two of the fourteen solutions are described herein, and contrasted with the solutions that accompany the starter kit.

Figure 8:
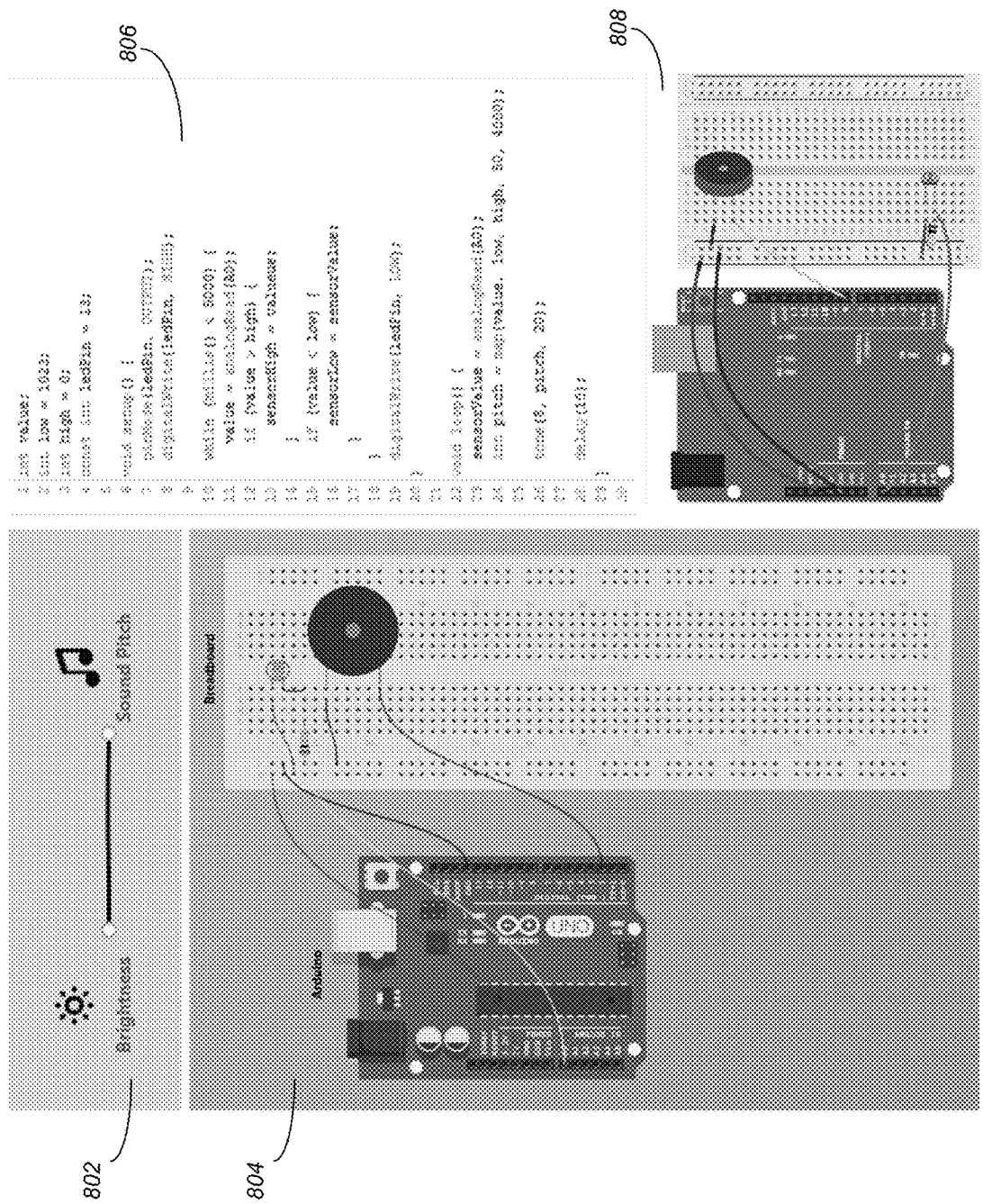
FIG. 8 illustrates a sample of the solution for the Light Theremin project in accordance with one or more embodiments of the invention.

One representative project in the starter kit is the 'Light Theremin', where a buzzer produces a tone, and the pitch of that tone is controlled by the amount of light falling on a sensor. This project requires the use of the continuous mapping functionality (i.e., Map-From and Map-To) within TAC. To author this functionality within TAC, the designer connects a 'Map From Brightness' to a 'Map To Sound Pitch', and provides two sample mappings which will be used in the linear interpolation mapping (e.g, 10 Lux→100 Hz, 50 Lux→2000 Hz). The six generated circuits all contain four components, and generate 31 lines of code, while the Arduino starter kit solution uses four components and 29 lines of code. FIG. 8 illustrates a sample of the solution for the Light Theremin project in accordance with one or more embodiments of the invention. Area 802 shows the program (e.g., the authoring canvas 104) and TAC-generated circuit 804 (e.g., the interactive diagram 108), while area 806 shows the provided code (e.g., firmware 104) and circuit 808 from the ARDUINO starter kit. Note the solutions are similar in components and circuitry.

Figure 9:
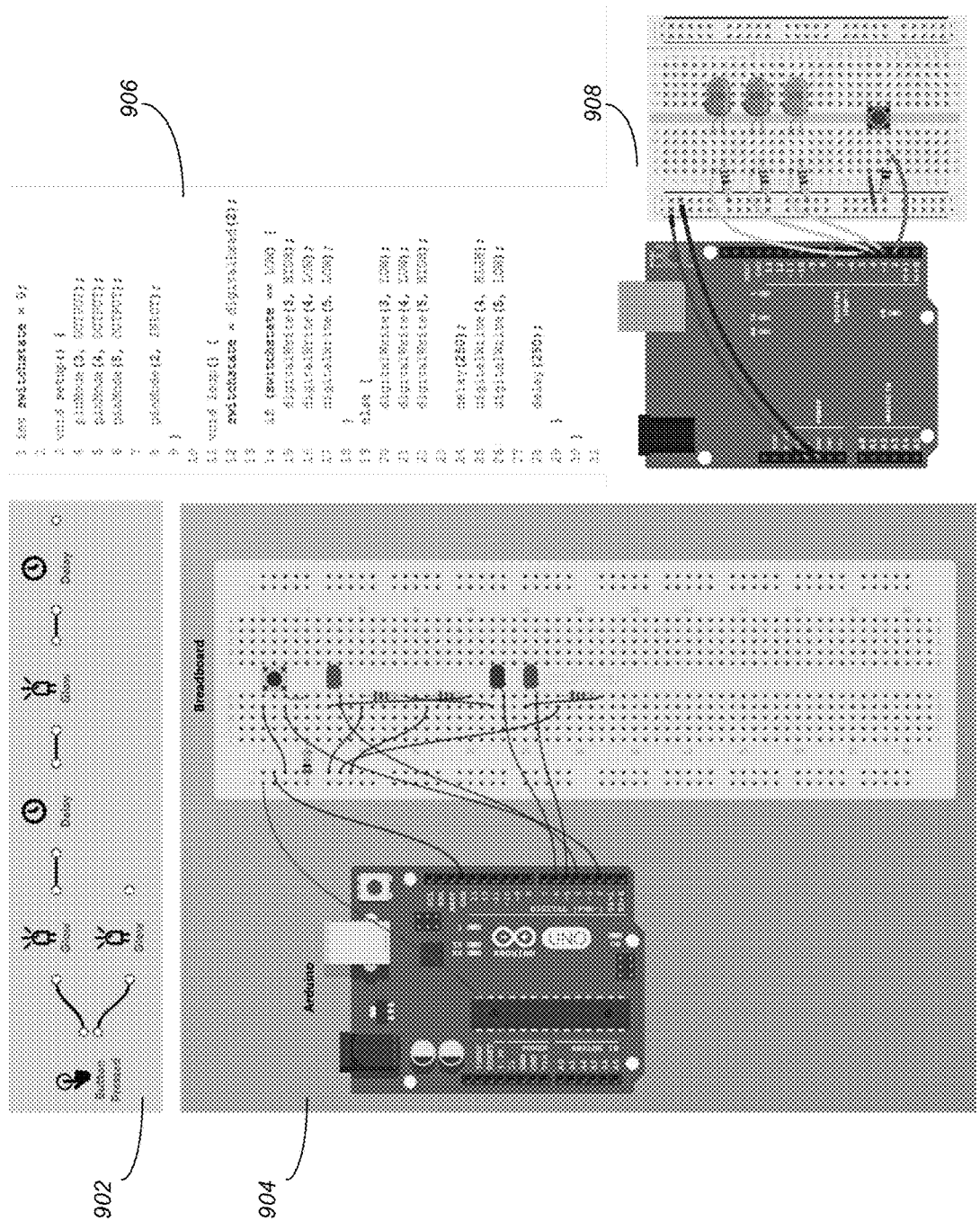
FIG. 9 illustrates a sample of a solution for Spaceship Interface project in accordance with one or more embodiments of the invention.

A second project from the starter kit is the 'Spaceship interface', which consists of 3 LEDs and a button. When the button is pressed, two of the LEDs illuminate in an alternating pattern; when the button is not pressed, the third LED lights up. With TAC, this is accomplished by using the 'Button pressed' trigger with two conditions (pressed and not-pressed), linked to 'Glow' and delay actions. FIG. 9 illustrates a sample of a solution for Spaceship Interface project in accordance with one or more embodiments of the invention. Area 902 shows the program (e.g., the authoring canvas 102) and area 904 shows the TAC-generated circuit (e.g., in interactive diagram 108), while area 906 shows the provided code (e.g., firmware 104) and circuit 908 from the ARDUINO starter kit. All of the 108 resulting generated solutions to this behavior use 9 components, and generate 105 lines of code, while, the provided ARDUINO starter kit solution uses 9 components and 30 lines of code.

In view of the above, one may note that in general, the generated solutions may contain more complex code, and may have more complex wiring schemes than the hand-crafted, tailored alternatives in the starter kit examples. However, this validation demonstrates the breadth of the system, and also illustrates how limited input from the user (e.g., Mapping brightness to sound pitch) can be sufficient for the system to create the circuitry, software, and assembly instructions for the user.

User Study

Though TAC is able to generate a broad set of circuitry and software that covers the content in the introductory ARDUINO material, it is not clear if such a paradigm is more approachable to users looking to design their own circuitry. To better understand this, embodiments of the invention conducted a study which assessed how well novice users were able to design, select, and assemble desired circuitry using TAC.

As a representative task, embodiments of the invention used a 'Love-o-Meter' project from the ARDUINO starter kit, which was also studied by Booth et al. [2]. This task is of moderate difficulty for a novice, can be completed in under an hour, uses a variety of components and programming concepts, and is grounded in prior work. Participants completed this task using either TAC (TAC condition), or using the ARDUINO IDE (integrated development environment) (Arduino condition) as in Booth et al [2].

Participants

Twelve individuals (8 male, M=35, SD=7.8 years of age) were recruited to participate in the study. The experiment lasted approximately one hour and participants received a $25 gift card as compensation for their time.

Before participating, participants self-reported their prior experience with programming and electronics. This information was used to balance the participants between the two conditions to ensure the populations were comparable. Mann-Whitney U tests indicated there was no significant difference between the two populations in terms of self-rated electronics experience (U=16.0; p=0.82) or programming experience (U=12.0; p=0.39).

Procedure

Participants were informed that they would be building a circuit using an Arduino. They were also given a brief tutorial on breadboards demonstrating how connections can be made with a breadboard (i.e., row-wise and column-wise connections). Depending on the condition, they were either given a brief overview of the ARDUINO IDE or the TAC interface. For the ARDUINO condition, participants were shown the editor, the upload and verify functionality, as well as the web browser (GOOGLE CHROME). Within the TAC condition, participants were shown the authoring canvas 102, the generated circuit explorer 110, diagram area 108, as well as the instruction 106 and firmware 104 windows.

After the introduction, participants were given a textual description of the functionality that they were asked to replicate. The text explained that their target circuit should use three LEDs which light up in sequence, with more LEDs lighting up as a temperature sensor detects hotter temperatures. Participants were given 45 minutes to complete the task, and were given all the components they would need including some distractor components. They were informed that they could use the internet to search for help, but were instructed not to search for the exact solution (e.g., do not search for 'light three LEDs in sequence in response to temperature'). This procedure is the same as in Booth et al. [2] and describes the functionality of the Love-o-Meter circuit presented in the Arduino starter kit.

Results

Figure 10:
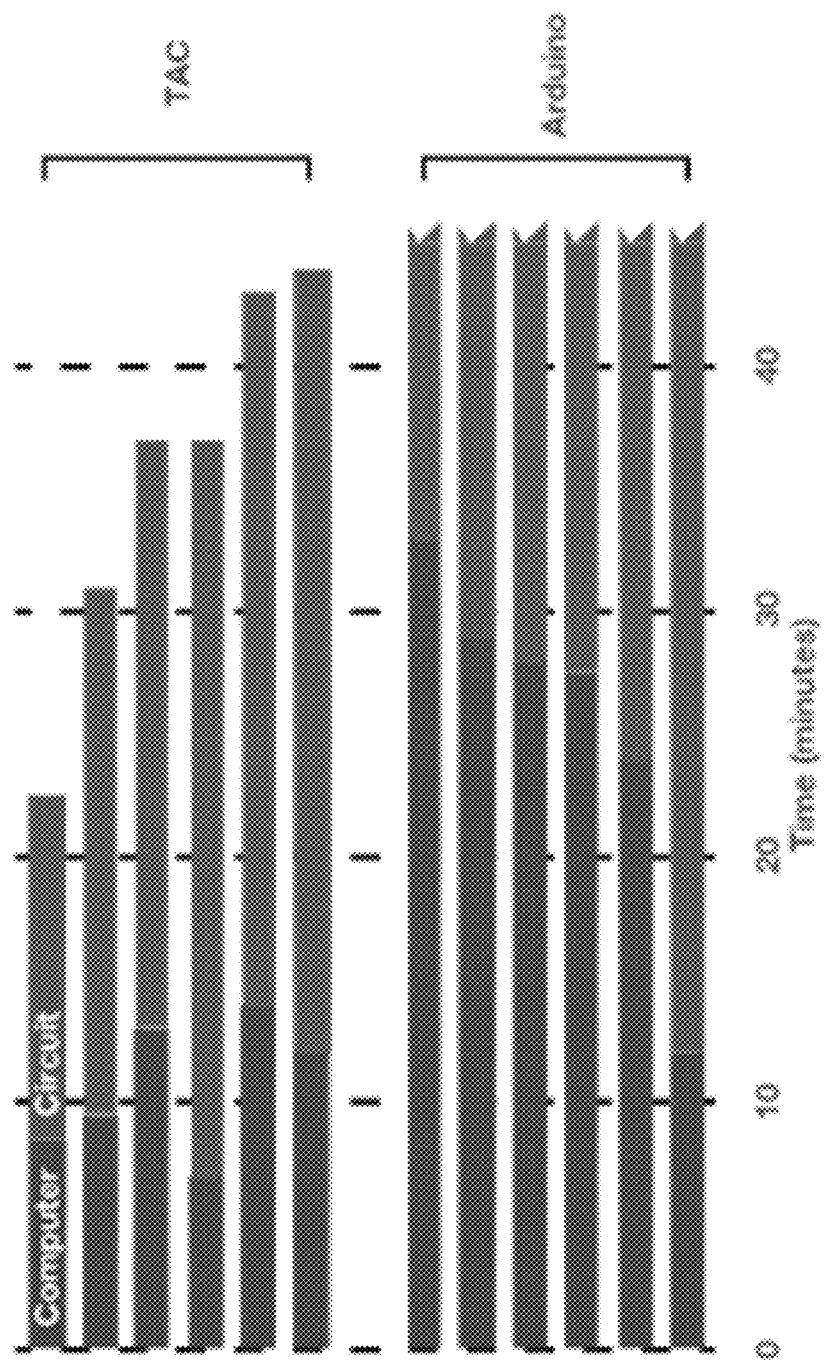
FIG. 10 illustrates a result graph of a circuit creation task in accordance with one or more embodiments of the invention.

All six of the participants using TAC completed the task successfully, while none of the participants without TAC were able to complete the task within the allotted time. FIG. 10 illustrates a result graph of a circuit creation task in accordance with one or more embodiments of the invention. FIG. 10 shows each participant's total time during the study, separated by time spent on the computer, and time spent with the circuitry. These results are similar to those presented by Booth et al. [2] which found the majority of participants unable to complete the circuit. For the participants using TAC, the average completion time was 36 minutes (SD=7.4 minutes), and a Mann-Whitney U test shows this is significantly lower than the ARDUINO condition (U=0; p<0.01) (note that U is zero because all values in the ARDUINO condition are greater than the TAC condition) where all participants exceeded the 45 minute time frame. As none of the participants in the ARDUINO condition finished, the task was decomposed into eight subtasks representing observable milestones such as 'uploaded a program' 'connected temperature sensor' and 'controlled an LED based on temperature value'. A Mann-Whitney U test shows a significant difference between the ARDUINO and TAC conditions (U=0.0; p<0.01) in terms of number of subtasks completed; all participants in the TAC condition completed all 8 tasks, participants in the ARDUINO condition completed 4.5 tasks on average. Two participants struggled, completing only 1 or 2 tasks, while three participants nearly arrived at the solution, completing 6 or 7 of the 8 subtasks.

The time users spent actively using the computer (coding, reading, etc.) versus the time spent working with the circuitry (assembling the circuit, looking at the components) was also compared. A Mann-Whitney U test shows the time spent on the computer was significantly different between the conditions (U=2.5; p<0.01). The time spent with the circuitry was not different between the two groups, likely because none of the participants in the ARDUINO condition were able to complete the task, so the time spent with circuitry is not reflective of the total time it would've taken if they had finished.

Observations

Overall, the study demonstrated that TAC enabled people without significant experience with circuitry to design and construct functional electronic circuits. One participant felt that after using TAC 'I could tackle a much harder project (and want to) that uses sound and social media' (P9).

Participants found the behavior authoring interface intuitive, and most participants using TAC arrived at the correct behavior within 10 minutes. Some tried to use To-From mappings unsuccessfully before switching to the Trigger-Action paradigm. Additionally, one participant used multiple 'Hotter Than' behaviors resulting in the use of 3 temperature sensors in the subsequent circuits, which they corrected after seeing the diagram.

Several elements of the interface were observed to be quite useful for the novice participants, in particular the rendered circuit diagram. Most of the participants did not follow the step-by-step written instructions, but instead opted to wire the circuit by looking at the diagram. Occasionally, these participants would click on a wire in the diagram to highlight it and see the related text (e.g., to see what pin it was connected to). Participant comments reiterated the perceived utility of the diagram 'The mappings between instructions and diagram was helpful' (P15). 'I liked how the instructions highlighted the wire that needed to be connected' (P5). This behavior of consulting the diagram was not limited to participants using the TAC system. Participants in the ARDUINO condition often consulted photos or diagrams when trying to determine how to wire and place components, even when there were textual descriptions on the same page.

While participants were able to successfully navigate and select a circuit within the generated circuit explorer 110, many were unsure which circuit they should choose. Some opted to minimize cost, while others chose at random. Few seemed to note the 'Components Available' column was relevant, indicating which circuits could be built with the components they were given. User feedback suggests that the 'Circuit options [are] a little intimidating' (P7). One explanation for this is that the task was a laboratory study, and elements such as cost and popularity may not have relevance. Embodiments of the invention may further determine what elements should be provided in the circuit explorer, or what use cases may not need the explorer and instead just have a single circuit presented.

While most participants used the firmware window solely to upload the code to the microcontroller, one participant with some programming experience used it to edit the parameters during testing. Before uploading, he first skimmed the code to get a basic understanding, then, when trying to determine which threshold parameter should be used to trigger the lights, he edited the code directly and uploaded it. While the same operation can be done using the visual programming interface, it took less effort and was perhaps more intuitive to directly modify the code.

Alternative Embodiments

Embodiments of the invention have shown that the use of goal-driven design to define circuitry can enable novice users to design and construct electronic devices that they may otherwise be unable to.

Embodiments of the invention may not only generate circuits and software, but the code, and the diagram may be optimized for learnability, human-readability, to provide context on the function of each part of the code, and the purpose of the fragment within the larger program. Such embodiments enable users to more effectively learn electronics from the system's output, and may further provide the ability to generate custom tutorials for students. While optimizations can be made to enhance the learnability of the generated circuits, the process of automating the circuit creation may inevitably removes some opportunity for learning and exploring.

Embodiments of the invention may provide an authoring interface 102 with limited support for higher-level software constructs, such as looping and complex branching conditions. However, embodiments of the invention may provide visual programming language enhancements that solve such an issue, as well as solving the issue of changes made directly to the generated firmware not being reflected in the visual authoring environment.

Further to the above, embodiments of the invention may be limited to generating ARDUINO-based circuitry, while alternative embodiments may support the generation of circuits that do not include a microcontroller. For example, having an LED glow when a button is pressed only requires a button, resistor, LED and battery, some embodiments supporting such a behavior may also require a microcontroller while others do not.

Embodiments of the invention may be focused on novice users. However, the application of generative design and design synthesis has many use cases amongst expert users as well. For instance, a generative design approach to circuitry, in accordance with embodiments of the invention, may allow experts to exchange equivalent circuits easily, allow for rapidly sharing projects in multiple forms for the maker community, and enable rapid prototyping with available parts while easing the transition to manufacturing large quantities with equivalent functionality. Such embodiments may accurately encode enough information to ensure that two components or circuits are actually 'equivalent' in terms of the desired functionality.

Lastly, as the circuit and software generation is an automated process, it isolates the user from how the circuit functions, making debugging difficult if something goes wrong. As such, the user does not know if the issue is with their program, or their assembly of the circuits (and components). Embodiments of the invention may mitigate this is by integrating a software simulator so the user can verify their logic is correct before assembling the circuit. Such embodiments may integrate new technology, such as Toast-board [9].

Hardware and Software Environment

Figure 11:
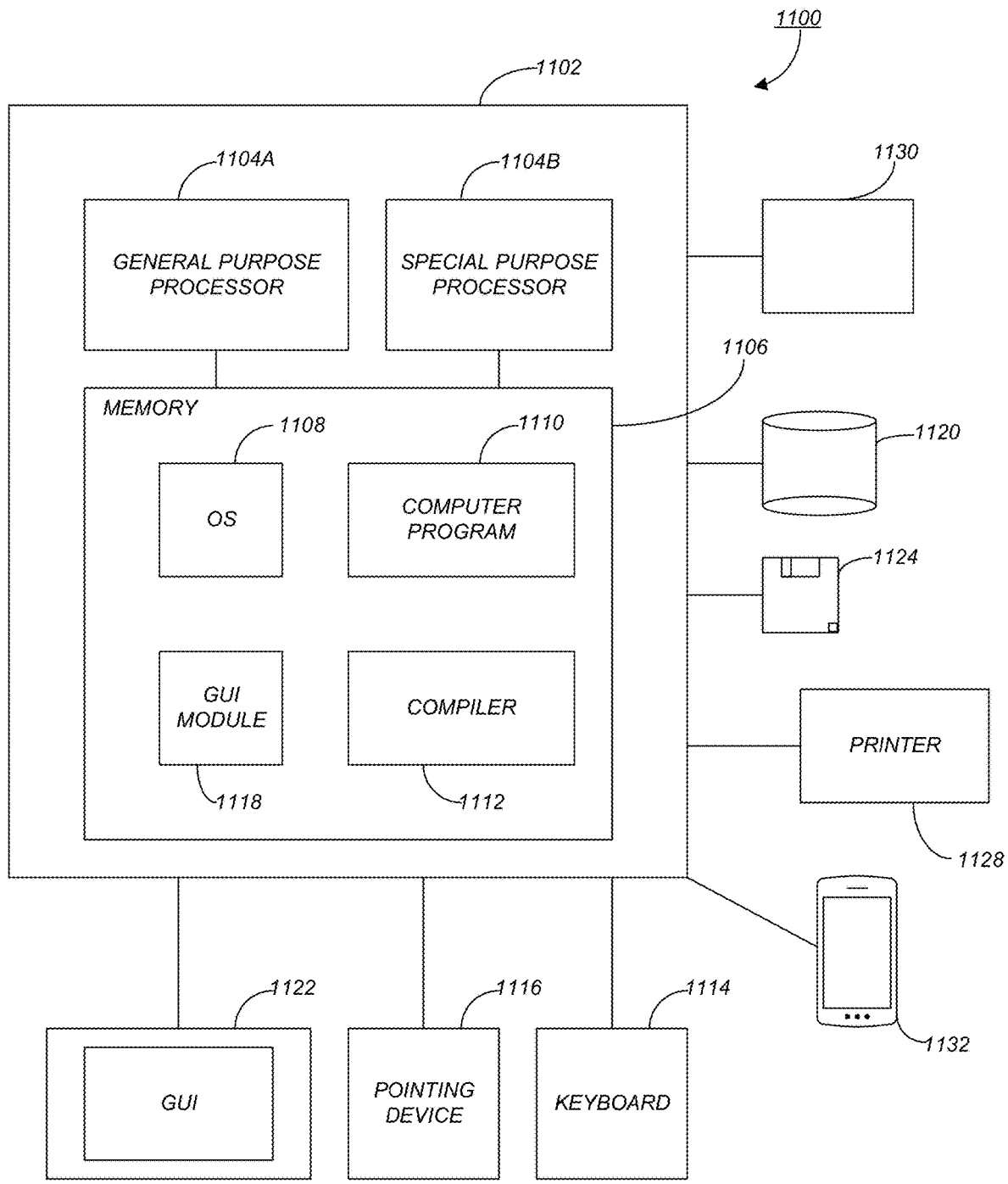
FIG. 11 is an exemplary hardware and software environment used to implement one or more embodiments of the invention.

FIG. 11 is an exemplary hardware and software environment 1100 used to implement one or more embodiments of the invention. The hardware and software environment includes a computer 1102 and may include peripherals. Computer 1102 may be a user/client computer, server computer, or may be a database computer. The computer 1102 comprises a hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1114, a cursor control device 1116 (e.g., a mouse, a pointing device, pen and tablet, touch screen, multi-touch device, etc.) and a printer 1128. In one or more embodiments, computer 1102 may be coupled to, or may comprise, a portable or media viewing/listening device 1132 (e.g., an MP3 player, IPOD, NOOK, portable digital video player, cellular device, personal digital assistant, etc.). In yet another embodiment, the computer 1102 may comprise a multi-touch device, mobile phone, gaming system, internet enabled television, television set top box, or other internet enabled device executing on various platforms and operating systems.

In one embodiment, the computer 1102 operates by the processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

Output/results may be presented on the display 1122 or provided to another device for presentation or further processing or action. In one embodiment, the display 1122 comprises a liquid crystal display (LCD) having a plurality of separately addressable liquid crystals. Alternatively, the display 1122 may comprise a light emitting diode (LED) display having clusters of red, green and blue diodes driven together to form full-color pixels. Each liquid crystal or pixel of the display 1122 changes to an opaque or translucent state to form a part of the image on the display in response to the data or information generated by the processor 1104 from the application of the instructions of the computer program 1110 and/or operating system 1108 to the input and commands. The image may be provided through a graphical user interface (GUI) module 1118. Although the GUI module 1118 is depicted as a separate module, the instructions performing the GUI functions can be resident or distributed in the operating system 1108, the computer program 1110, or implemented with special purpose memory and processors.

In one or more embodiments, the display 1122 is integrated with/into the computer 1102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 1102 according to the computer program 1110 instructions may be implemented in a special purpose processor 1104B. In this embodiment, the some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more functions such as responding to computer program 1110 instructions. In one embodiment, the special purpose processor 1104B is an application specific integrated circuit (ASIC).

The computer 1102 may also implement a compiler 1112 that allows an application or computer program 1110 written in a programming language such as C, C++, Assembly, SQL, PYTHON, PROLOG, MATLAB, RUBY, RAILS, HASKELL, or other language to be translated into processor 1104 readable code. Alternatively, the compiler 1112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1110 accesses and manipulates data accepted from I/O devices and stored in the memory 1106 of the computer 1102 using the relationships and logic that were generated using the compiler 1112.

The computer 1102 also optionally comprises an external communication device such as a modem, satellite link, Ethernet card, or other device for accepting input from, and providing output to, other computers 1102.

In one embodiment, instructions implementing the operating system 1108, the computer program 1110, and the compiler 1112 are tangibly embodied in a non-transitory computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of computer program 1110 instructions which, when accessed, read and executed by the computer 1102, cause the computer 1102 to perform the steps necessary to implement and/or use the present invention or to load the program of instructions into a memory 1106, thus creating a special purpose data structure causing the computer 1102 to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1102.

Figure 12:
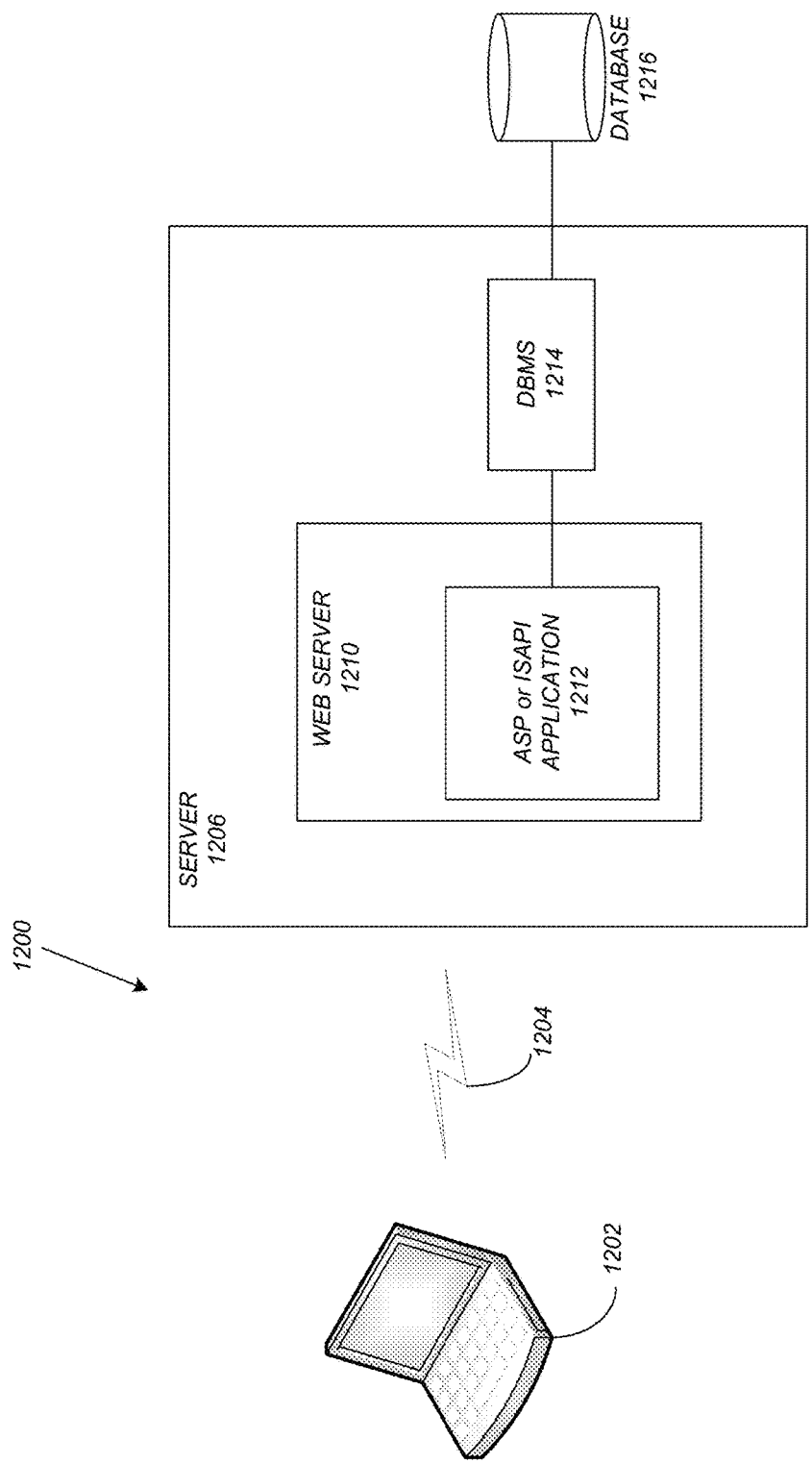
FIG. 12 schematically illustrates a typical distributed/cloud-based computer system using a network to connect client computers to server computers in accordance with one or more embodiments of the invention.

FIG. 12 schematically illustrates a typical distributed/cloud-based computer system 1200 using a network 1204 to connect client computers 1202 to server computers 1206. A typical combination of resources may include a network 1204 comprising the Internet, LANs (local area networks), WANs (wide area networks), SNA (systems network architecture) networks, or the like, clients 1202 that are personal computers or workstations (as set forth in FIG. 11), and servers 1206 that are personal computers, workstations, minicomputers, or mainframes (as set forth in FIG. 11). However, it may be noted that different networks such as a cellular network (e.g., GSM [global system for mobile communications] or otherwise), a satellite based network, or any other type of network may be used to connect clients 1202 and servers 1206 in accordance with embodiments of the invention.

A network 1204 such as the Internet connects clients 1202 to server computers 1206. Network 1204 may utilize ethernet, coaxial cable, wireless communications, radio frequency (RF), etc. to connect and provide the communication between clients 1202 and servers 1206. Further, in a cloud-based computing system, resources (e.g., storage, processors, applications, memory, infrastructure, etc.) in clients 1202 and server computers 1206 may be shared by clients 1202, server computers 1206, and users across one or more networks. Resources may be shared by multiple users and can be dynamically reallocated per demand. In this regard, cloud computing may be referred to as a model for enabling access to a shared pool of configurable computing resources.

Clients 1202 may execute a client application or web browser and communicate with server computers 1206 executing web servers 1210. Such a web browser is typically a program such as MICROSOFT INTERNET EXPLORER, MOZILLA FIREFOX, OPERA, APPLE SAFARI, GOOGLE CHROME, etc. Further, the software executing on clients 1202 may be downloaded from server computer 1206 to client computers 1202 and installed as a plug-in or ACTIVEX control of a web browser. Accordingly, clients 1202 may utilize ACTIVEX components/component object model (COM) or distributed COM (DCOM) components to provide a user interface on a display of client 1202. The web server 1210 is typically a program such as MICROSOFT'S INTERNET INFORMATION SERVER.

Web server 1210 may host an Active Server Page (ASP) or Internet Server Application Programming Interface (ISAPI) application 1212, which may be executing scripts. The scripts invoke objects that execute business logic (referred to as business objects). The business objects then manipulate data in database 1216 through a database management system (DBMS) 1214. Alternatively, database 1216 may be part of, or connected directly to, client 1202 instead of communicating/obtaining the information from database 1216 across network 1204. When a developer encapsulates the business functionality into objects, the system may be referred to as a component object model (COM) system. Accordingly, the scripts executing on web server 1210 (and/or application 1212) invoke COM objects that implement the business logic. Further, server 1206 may utilize MICROSOFT'S TRANSACTION SERVER (MTS) to access required data stored in database 1216 via an interface such as ADO (Active Data Objects), OLE DB (Object Linking and Embedding DataBase), or ODBC (Open DataBase Connectivity).

Generally, these components 1200-1216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1202 and 1206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1202 and 1206. Further, embodiments of the invention may be implemented as a software application on a client 1202 or server computer 1206. In addition, as described above, the client 1202 or server computer 1206 may comprise a thin client device or a portable device that has a multi-touch-based display.

Logical Flow

Figure 13:
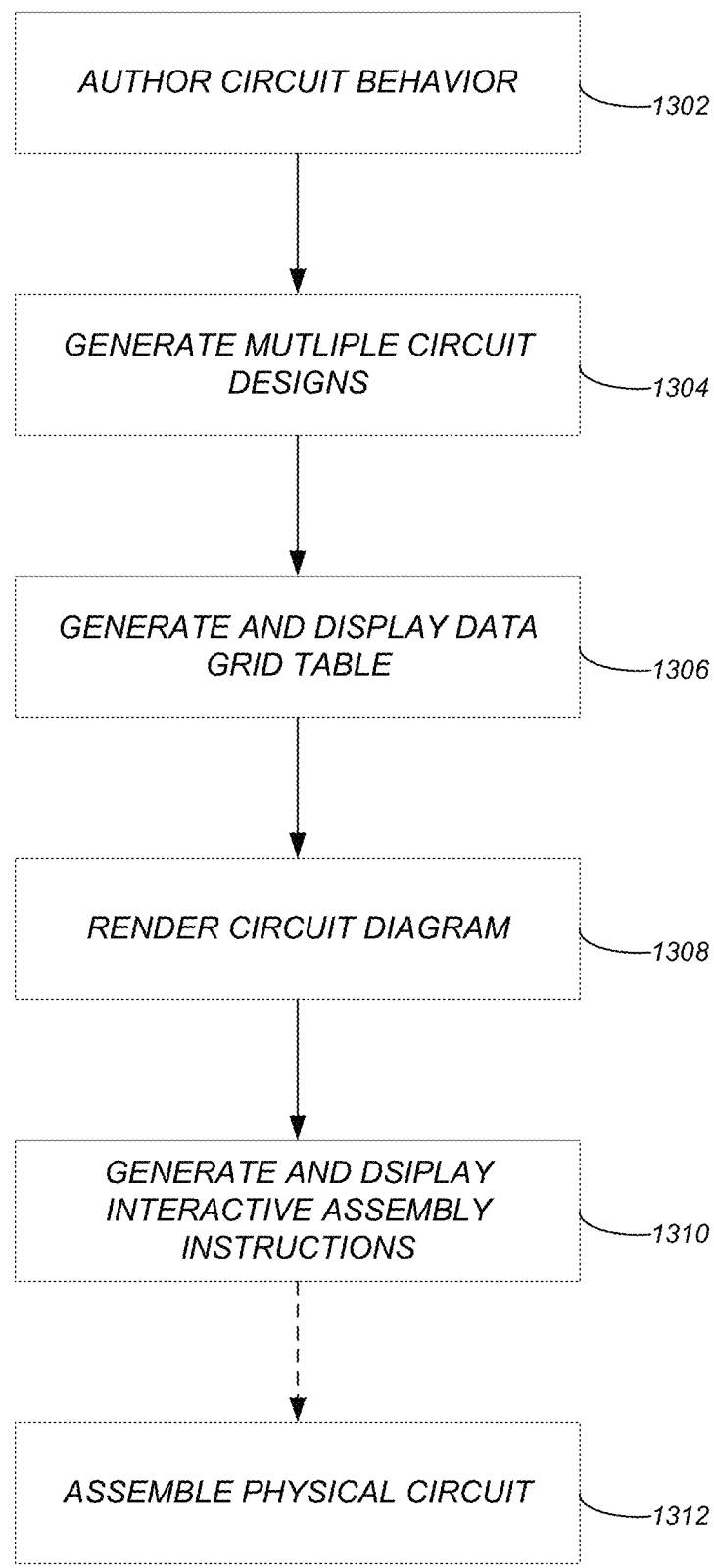
FIG. 13 illustrates the logical flow for designing a circuit in accordance with one or more embodiments of the invention.

FIG. 13 illustrates the logical flow for designing a circuit in accordance with one or more embodiments of the invention.

At step 1302, a behavior of the circuit is authored by dragging two or more nodes from one or more side panels into an authoring canvas, and connecting the two or more nodes in the authoring canvas. The connected two or more nodes represent the behavior of the circuit. Such an authoring canvas and authoring may be performed through a visual programming language in a graphical user interface. The two or more connected nodes may be trigger nodes representing trigger events and action nodes representing actions. In such embodiments, the connected nodes provide a trigger-action mapping that specifies one or more actions to be completed when the one or more trigger events occur. Alternatively, the nodes may be input nodes representing input parameters and output nodes representing output parameters. In such embodiments, the connected nodes provide a from-to mapping that specifies a linear relationship between the input parameters and the output parameters.

At step 1304, two or more circuit designs are generated. Each of the two or more circuit designs provides a solution that satisfies the behavior (that was authored in step 1302).

At step 1306, a data grid table (for the two or more circuit designs) is generated and displayed. Each row of the data grid table represents one of the two or more circuit designs. The data grid table is sortable based on one or more columns of the data grid table. Further, each column of the data grid table represents a computed metric for the two or more circuit designs. The circuit designs that are displayed in the data grid table may be filtered (e.g., such that fewer circuits are displayed) based on one or more of the computed metrics. For example, one of the computed metrics may indicate whether a component is available (e.g., for use in the circuit).

At step 1308, upon selecting one of the two or more circuit designs in the data grid table, a computer generated circuit diagram of the selected circuit design is rendered in an interactive circuit diagram area. Such a rendering may be performed in a particular order/manner. First, a microcontroller may be rendered/placed in a fixed, central location of the interactive circuit diagram area. Next, a breadboard may be rendered/placed adjacent to the microcontroller such that rows of breadboard holes run parallel to pin rows of pins on the microcontroller. Thereafter, individual electronic components are rendered/placed on the breadboard, with electric pins of the individual electronic components aligned with corresponding breadboard holes. Once the components are placed, a curved line (e.g., a Bezier curve) is drawn/rendered/placed between each pair of electrical terminals to be connected (each pair may consist of a breadboard terminal and a microcontroller terminal).

Further to the above, as each electronic component is rendered, a database of the rows of corresponding breadboard holes that each of the individual electronic components uses may be maintained. Based on the database, future components may be prevented from being inserted into the rows of corresponding breadboard holes that are being used. In addition, an order for rendering each individual electronic component on the breadboard may be optimized (e.g., the first component is the component corresponding to the lowest pin number on the microcontroller, or varying placement and utilizing placement that results with the minimum number of wire crossings, etc.).

At step 1310, interactive assembly instructions for the circuit are generated and displayed. The interactive assembly instructions provide a step-by-step text-based guide to wire the circuit. Further, upon selecting one of the interactive assembly instructions, a corresponding element in the computer generated circuit diagram is highlighted. Such a corresponding element may be a connection and an electrical component of the circuit. Step 1310 may further include the ability to hover over the corresponding element, upon which an assembly tooltip relevant to an assembly of the hovered over corresponding element is rendered/displayed.

Lastly, at optional step 1312, an assembled functioning circuit corresponding to the selected circuit design may be physically assembled (e.g., by a user) by following the interactive assembly instructions.

In view of the above, embodiments of the invention provide the ability to explore functioning, computer generated circuitry using a data grid with sortable columns for computed circuit metrics. Computer generated circuit diagrams are rendered to aid the user in selecting an appropriate circuit. The user has the ability to filter components from the circuit database through an interactive circuit diagram. In addition, interactive circuit assembly instructions are integrated with the interactive circuit diagram such that the relevant component/connections are highlighted upon selection of a corresponding step in the assembly instructions. Further, various user interface elements improve the utility of the invention. For example, assembly tips may be presented for each component as the component is hovered over, and behaviors may be separated into triggers/actions and map-to/map-from, etc.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a trigger action circuit (TAC) generation, the first system capable of leveraging generative design to create a multitude of design variants for circuitry. The system has a low threshold for novices to begin designing circuitry, and provides the circuit diagram, code, and assembly instructions to enable them to construct a functioning circuit. Through validation by recreating existing projects, and a user study comparing it to the ARDUINO baseline, TAC was shown to be useful and usable by novice circuit designers, and more efficient than novices using more traditional approaches.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1]. Martin Philip Bendsoe and Ole Sigmund. 2013. Topology optimization: theory, methods, and applications. Springer Science & Business Media.
[2]. Tracey Booth, Simone Stumpf, Jon Bird, and Sara Jones. 2016. Crossed Wires: Investigating the Problems of End-User Developers in a Physical Computing Task. Proceedings of the 2016 CHI Conference on Human Factors in Computing Systems (CHI '16), ACM, 3485-3497.
[3]. Luisa Caldas. 2008. Generation of energy-efficient architecture solutions applying GENE_ARCH: An evolution-based generative design system. Advanced Engineering Informatics 22, 1: 59-70.
[4]. Amaresh Chakrabarti, Kristina Shea, Robert Stone, et al. 2011. Computer-Based Design Synthesis Research: An Overview. Journal of Computing and Information Science in Engineering 11, 2: 021003-021003-10.
[5]. Scott C. Chase. 2005. Generative design tools for novice designers: Issues for selection. Automation in Construction 14, 6: 689-698.
[6]. Anind K. Dey, Gregory D. Abowd, and Daniel Salber. 2001. A Conceptual Framework and a Toolkit for Supporting the Rapid Prototyping of Context-aware Applications. Hum.-Comput. Interact. 16, 2: 97-166.
[7]. Anind K. Dey, Raffay Hamid, Chris Beckmann, Ian Li, and Daniel Hsu. 2004. A CAPpella: Programming by Demonstration of Context-aware Applications. Proceedings of the SIGCHI Conference on Human Factors in Computing Systems (CHI '04), ACM, 33-40.
[8]. Anind K. Dey, Timothy Sohn, Sara Streng, and Justin Kodama. 2006. iCAP: Interactive Prototyping of Context-Aware Applications. In Pervasive Computing, Kenneth P. Fishkin, Bernt Schiele, Paddy Nixon and Aaron Quigley (eds.). Springer Berlin Heidelberg, 254-271.
[9]. Daniel Drew, Julie L. Newcomb, William McGrath, Filip Maksimovic, David Mellis, and Björn Hartmann. 2016. The Toastboard: Ubiquitous Instrumentation and Automated Checking of Breadboarded Circuits. Proceedings of the 29th Annual Symposium on User Interface Software and Technology (UIST '16), ACM, 677-686.
[10]. Bruno Ferreira and António Leitão. 2015. Generative Design for Building Information Modeling. Real Time-Proceedings of the 33rd eCAADe Conference, 635-644.
[11]. S. Greenberg and C. Fitchett. 2001. Phidgets: easy development of physical interfaces through physical widgets. ACM, 209-218.
[12]. Björn Hartmann, Leith Abdulla, Manas Mittal, and Scott R. Klemmer. 2007. Authoring Sensor-based Interactions by Demonstration with Direct Manipulation and Pattern Recognition. Proceedings of the SIGCHI Conference on Human Factors in Computing Systems (CHI '07), ACM, 145-154.
[13]. Björn Hartmann, Scott R. Klemmer, Michael Bernstein, et al. 2006. Reflective Physical Prototyping Through Integrated Design, Test, and Analysis. Proceedings of the 19th Annual ACM Symposium on User Interface Software and Technology (UIST '06), ACM, 299-308.
[14]. Steve Hodges, Nicolas Villar, Nicholas Chen, et al. 2014. Circuit Stickers: Peel-and-stick Construction of Interactive Electronic Prototypes. Proceedings of the 32Nd Annual ACM Conference on Human Factors in Computing Systems (CHI '14), ACM, 1743-1746.
[15]. Steven Houben, Connie Golsteijn, Sarah Gallacher, et al. 2016. Physikit: Data Engagement Through Physical Ambient Visualizations in the Home. Proceedings of the 2016 CHI Conference on Human Factors in Computing Systems (CHI '16), ACM, 1608-1619.
[16]. Jan Humble, Andy Crabtree, Terry Hemmings, et al. 2003. "Playing with the Bits" User-Configuration of Ubiquitous Domestic Environments. In UbiComp 2003: Ubiquitous Computing, Anind K. Dey, Albrecht Schmidt and Joseph F. McCarthy (eds.). Springer Berlin Heidelberg, 256-263.
[17]. Yoshihiro Kawahara, Steve Hodges, Benjamin S. Cook, Cheng Zhang, and Gregory D. Abowd. 2013. Instant Inkjet Circuits: Lab-based Inkjet Printing to Support Rapid Prototyping of UbiComp Devices. Proceedings of the 2013 ACM International Joint Conference on Pervasive and Ubiquitous Computing (UbiComp '13), ACM, 363-372.
[18]. Majeed Kazemitabaar, Jason McPeak, Alexander Jiao, Liang He, Thomas Outing, and Jon E. Froehlich. 2017. MakerWear: A Tangible Approach to Interactive Wearable Creation for Children. Proceedings of the 2017 CHI Conference on Human Factors in Computing Systems (CHI '17), ACM, 133-145.
[19]. Sivam Krish. 2011. A practical generative design method. Computer-Aided Design 43, 1: 88-100.
[20]. David Ledo, Fraser Anderson, Ryan Schmidt, Lora Oehlberg, Saul Greenberg, and Tovi Grossman. 2017. Pineal: Bringing Passive Objects to Life with Embedded Mobile Devices. Proceedings of the 2017 CHI Conference on Human Factors in Computing Systems (CHI '17), ACM, 2583-2593.
[21]. Joanne Lo, Cesar Torres, Isabel Yang, et al. 2016. Aesthetic Electronics: Designing, Sketching, and Fabricating Circuits Through Digital Exploration. Proceedings of the 29th Annual Symposium on User Interface Software and Technology (UIST '16), ACM, 665-676.
[22]. Don MacMillen, Raul Camposano, D. Hill, and Thomas W. Williams. 2000. An industrial view of electronic design automation. IEEE transactions on computer-aided design of integrated circuits and systems 19, 12: 1428-1448.
[23]. Will McGrath, Daniel Drew, Jeremy Warner, Majeed Kazemitabaar, Mitchell Karchemsky, David Mellis and Björn Hartmann. 2017. Bifrost: An Interface for Visualizing and Debugging the Behavior of Embedded Systems. Proceedings of ACM User Interface and Software Technology, ACM.

[24]. David A. Mellis, Leah Buechley, Mitchel Resnick, and Björn Hartmann. 2016. Engaging Amateurs in the Design, Fabrication, and Assembly of Electronic Devices. Proceedings of the 2016 ACM Conference on Designing Interactive Systems (DIS '16), ACM, 1270-1281.

[25]. Raf Ramakers, Fraser Anderson, Tovi Grossman, and George Fitzmaurice. 2016. RetroFab: A Design Tool for Retrofitting Physical Interfaces Using Actuators, Sensors and 3D Printing. Proceedings of the 2016 CHI Conference on Human Factors in Computing Systems (CHI '16), ACM, 409-419.

[26]. Raf Ramakers, Kashyap Todi, and Kris Luyten. 2015. PaperPulse: An Integrated Approach for Embedding Electronics in Paper Designs. ACM SIGGRAPH 2015 Posters (SIGGRAPH '15), ACM, 9:1-9:1.

[27]. Rohit Ramesh, Richard Lin, Antonio Iannopollo, Alberto Sangiovanni-Vincentelli, Björn Hartmann, and Prabal Dutta. 2017. Turning Coders into Makers: The Promise of Embedded Design Generation. Proceedings of the 1st Annual ACM Symposium on Computational Fabrication (SCF '17), ACM, 4:1-4:10.

[28]. Mitchel Resnick, Brad Myers, Kumiyo Nakakoji, et al. 2005. Design principles for tools to support creative thinking.

[29]. Daniel Salber, Anind K. Dey, and Gregory D. Abowd. 1999. The Context Toolkit: Aiding the Development of Context-enabled Applications. Proceedings of the SIGCHI Conference on Human Factors in Computing Systems (CHI '99), ACM, 434-441.

[30]. Adrian Thompson, Paul Layzell, and Ricardo Salem Zebulum. 1999. Explorations in design space: Unconventional electronics design through artificial evolution. IEEE Transactions on Evolutionary Computation 3, 3: 167-196.

[31]. Vesselin K. Vassilev, Dominic Job, and Julian F. Miller. 2000. Towards the automatic design of more efficient digital circuits. Evolvable Hardware, 2000. Proceedings. The Second NASA/DoD Workshop on, IEEE, 151-160.

[32]. Loutfouz Zaman, Wolfgang Stuerzlinger, Christian Neugebauer, et al. 2015. Gem-ni: A system for creating and managing alternatives in generative design. Proceedings of the 33rd Annual ACM Conference on Human Factors in Computing Systems, ACM, 1201-1210.

What is claimed is:

1. A computer-implemented method for designing a circuit, comprising:
   (a) authoring a behavior of the circuit by dragging two or more nodes from one or more side panels into an authoring canvas, and connecting the two or more nodes in the authoring canvas, wherein the connected two or more nodes represent the behavior of the circuit;
   (b) generating two or more circuit designs, wherein each of the two or more circuit designs provides a solution that satisfies the behavior;
   (c) generating and displaying a data grid table, for the two or more circuit designs, wherein:
      (1) each row of the data grid table represents one of the two or more circuit designs;
      (2) the data grid table is sortable based on one or more columns of the data grid table;
      (3) each column of the data grid table represents a computed metric for the two or more circuit designs;
   (d) upon selecting one of the two or more circuit designs in the data grid table, rendering a computer generated circuit diagram of the selected circuit design in an interactive circuit diagram area; and
   (e) generating and displaying interactive assembly instructions for the circuit, wherein:
      (1) the interactive assembly instructions provide a step-by-step guide to wire the circuit;
      (2) the interactive assembly instructions are text-based; and
      (3) upon selecting one of the interactive assembly instructions, a corresponding element in the computer generated circuit diagram is highlighted.

2. The computer-implemented method of claim 1, wherein:
   the two or more nodes comprise:
      one or more trigger nodes representing one or more trigger events; and
      one or more action nodes representing one or more actions
   the connected two or more nodes provide a trigger-action mapping that specifies the one or more actions to be completed when the one or more trigger events occur.

3. The computer-implemented method of claim 1, wherein:
   the two or more nodes comprise:
      one or more input nodes representing one or more input parameters; and
      one or more output nodes representing one or more output parameters;
   the connected two or more nodes provide a from-to mapping that specifies a linear relationship between the one or more input parameters and the one or more output parameters.

4. The computer-implemented method of claim 1, further comprising:
   filtering the two or more circuit designs that are displayed in the data grid table based on one or more of the computed metrics.

5. The computer-implemented method of claim 4, wherein the filtering is based on whether a component is available.

6. The computer-implemented method of claim 1, wherein the rendering the computer generated circuit diagram comprises:
   rendering a microcontroller in a fixed, central location of the interactive circuit diagram area;
   rendering a breadboard adjacent to the microcontroller, wherein rows of breadboard holes run parallel to pin rows of pins on the microcontroller;
   rendering individual electronic components on the breadboard, with electric pins of the individual electronic components aligned with corresponding breadboard holes; and
   drawing a curved line between each pair of electrical terminals to be connected, wherein each pair comprises a breadboard terminal and a microcontroller terminal.

7. The computer-implemented method of claim 6, further comprising:
   as each electronic component is rendered, maintaining a database of the rows of corresponding breadboard holes that each of the individual electronic components uses; and
   based on the database, preventing future components from being inserted into the rows of corresponding breadboard holes that are being used.

8. The computer-implemented method of claim 6, further comprising:
optimizing an order for rendering each individual electronic component on the breadboard.

9. The computer-implemented method of claim 1, wherein the corresponding element comprises a connection and an electrical component of the circuit.

10. The computer-implemented method of claim 1, wherein the generating and displaying the interactive assembly instructions further comprises:
upon hovering over the corresponding element, rendering an assembly tooltip relevant to an assembly of the hovered over corresponding element.

11. The computer-implemented method of claim 1, further comprising physically building an assembled functioning circuit corresponding to the selected circuit design by following the interactive assembly instructions.

12. A system for designing a circuit comprising:
(a) a computer having a memory;
(b) a processor executing on the computer;
(c) the memory storing a set of instructions, wherein the set of instructions, when executed by the processor cause the processor to perform operations comprising:
  (1) authoring a behavior of the circuit by dragging two or more nodes from one or more side panels into an authoring canvas, and connecting the two or more nodes in the authoring canvas, wherein the connected two or more nodes represent the behavior of the circuit;
  (2) generating two or more circuit designs, wherein each of the two or more circuit designs provides a solution that satisfies the behavior;
  (3) generating and displaying a data grid table, for the two or more circuit designs, wherein:
    (i) each row of the data grid table represents one of the two or more circuit designs;
    (ii) the data grid table is sortable based on one or more columns of the data grid table;
    (iii) each column of the data grid table represents a computed metric for the two or more circuit designs;
  (4) upon selecting one of the two or more circuit designs in the data grid table, rendering a computer generated circuit diagram of the selected circuit design in an interactive circuit diagram area; and
  (5) generating and displaying interactive assembly instructions for the circuit, wherein:
    (i) the interactive assembly instructions provide a step-by-step guide to wire the circuit;
    (ii) the interactive assembly instructions are text-based; and
    (iii) upon selecting one of the interactive assembly instructions, a corresponding element in the computer generated circuit diagram is highlighted.

13. The system of claim 12, wherein:
the two or more nodes comprise:
one or more trigger nodes representing one or more trigger events; and
one or more action nodes representing one or more actions
the connected two or more nodes provide a trigger-action mapping that specifies the one or more actions to be completed when the one or more trigger events occur.

14. The system of claim 12, wherein:
the two or more nodes comprise:
one or more input nodes representing one or more input parameters; and
one or more output nodes representing one or more output parameters;
the connected two or more nodes provide a from-to mapping that specifies a linear relationship between the one or more input parameters and the one or more output parameters.

15. The system of claim 12, wherein the operations further comprise:
filtering the two or more circuit designs that are displayed in the data grid table based on one or more of the computed metrics.

16. The system of claim 15, wherein the filtering is based on whether a component is available.

17. The system of claim 12, wherein the rendering the computer generated circuit diagram comprises:
rendering a microcontroller in a fixed, central location of the interactive circuit diagram area;
rendering a breadboard adjacent to the microcontroller, wherein rows of breadboard holes run parallel to pin rows of pins on the microcontroller;
rendering individual electronic components on the breadboard, with electric pins of the individual electronic components aligned with corresponding breadboard holes; and
drawing a curved line between each pair of electrical terminals to be connected, wherein each pair comprises a breadboard terminal and a microcontroller terminal.

18. The system of claim 17, wherein the operations further comprise:
as each electronic component is rendered, maintaining a database of the rows of corresponding breadboard holes that each of the individual electronic components uses; and
based on the database, preventing future components from being inserted into the rows of corresponding breadboard holes that are being used.

19. The system of claim 17, wherein the operations further comprise:
optimizing an order for rendering each individual electronic component on the breadboard.

20. The system of claim 12, wherein the corresponding element comprises a connection and an electrical component of the circuit.

21. The system of claim 12, wherein the generating and displaying the interactive assembly instructions further comprises:
upon hovering over the corresponding element, rendering an assembly tooltip relevant to an assembly of the hovered over corresponding element.

22. The system of claim 12, wherein the operations further comprise physically building an assembled functioning circuit corresponding to the selected circuit design by following the interactive assembly instructions.

* * * * *